United States Patent [19]

Tsuzuki et al.

[11] Patent Number: 6,027,870
[45] Date of Patent: *Feb. 22, 2000

[54] PHOTOTHERMOGRAPHIC MATERIAL

[75] Inventors: Hirohiko Tsuzuki; Yoshio Inagaki, both of Minami Ashigara, Japan

[73] Assignee: Fuji Photo Film Co., Ltd., Ashigara, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,354

[22] Filed: Apr. 15, 1997

[30] Foreign Application Priority Data

Apr. 15, 1996 [JP] Japan .................................. 8-092380
Apr. 16, 1996 [JP] Japan .................................. 8-094498

[51] Int. Cl.$^7$ .............................. G03C 1/498; G03C 1/20
[52] U.S. Cl. ........................... 430/584; 430/619; 430/944
[58] Field of Search ..................................... 430/584, 619, 430/581, 583, 944

[56] References Cited

U.S. PATENT DOCUMENTS

| | | | |
|---|---|---|---|
| 3,582,344 | 6/1971 | Heseltine et al. | 430/584 |
| 5,393,654 | 2/1995 | Burrows et al. | 430/584 |
| 5,441,866 | 8/1995 | Miller | 430/619 |
| 5,541,054 | 7/1996 | Miller et al. | 430/619 |
| 5,677,121 | 10/1997 | Tsuzuki . | |

*Primary Examiner*—Thorl Chea
*Attorney, Agent, or Firm*—Birch, Stewart, Kolasch & Birch, LLP

[57] ABSTRACT

An infrared-sensitive photothermographic material comprising light-sensitive silver halide grains and a sensitizing dye having a particular structural formula.

15 Claims, No Drawings

PHOTOTHERMOGRAPHIC MATERIAL

FIELD OF THE INVENTION

The present invention relates to a photothermographic material.

BACKGROUND OF THE INVENTION

In view of the recent trend towards preservation of the environment and space saving, the field of clinical photography has strongly desired a reduction in the quantity of processing waste. Thus, it has been required to develop the technology concerning photosensitive photothermographic materials which can achieve great effect in the exposure with a laser imagesetter or laser imager and produce clear black images having high resolution to enable the use as clinical photographs for assisting diagnosis and medical treatment. With such photosensitive photothermographic materials, the use of processing chemicals of solution type can be made needless and a simpler heat-development processing system causing no damage to the environment can be afforded to customers.

On the other hand, the semiconductor laser technology which has made expeditious progress in recent years enables the miniaturization of a medical image-output unit. As a matter of course, there have been developed the arts of producing infrared-sensitive (light- and heat-sensitive) silver halide photographic materials which make it possible to use a semiconductor laser as a light source. More specifically, the spectral sensitization arts applied to such photographic materials are disclosed in JP-B-03-10391 (The term "JP-B" as used herein means an "examined Japanese patent publication"), JP-B-06-52387, JP-A-05-341432 (The term "JP-A" at used herein means an "unexamined published Japanese patent application"), JP-A-06-194781 and JP-A-06-301141, and the anti-halation arts applied thereto are disclosed in JP-A-07-13295 and U.S. Pat. No. 5,380,635. In the photosensitive materials produced with a view to the exposure to infrared rays, the absorption of visible rays by sensitizing dyes and anti-halation dyes can be reduced to a great extent, so that it is easy to render such photosensitive materials colorless in a substantial sense.

However, dyes of the kind which can produce spectral sensitizing effect by the absorption of infrared rays generally have strong reducing power because of their high "HOMO", so that the fogging in photosensitive materials containing such dyes tends to be worsened due to reduction of the silver ions in the photosensitive materials. In particular, such dyes have a problem of causing a marked change in photographic properties upon storage under a high temperature-high humidity condition or for a long time. Conversely, the dyes of low "HOMO" employed for preventing the deterioration in keeping properties are inferior in spectral sensitizing efficiency because they are correlatively low in "LUMO", so that the photosensitive materials containing those dyes are low in sensitivity. Not only the photographic materials of wet process type encounter the problems concerning the sensitivity and the keeping properties as mentioned above, but also those problems become more serious in photothermographic materials relating to the present invention.

In addition, it is only natural that the reducing power produced by a dye has a tendency to be enhanced with an increase in the dye content. However, a decrease of the dye content results in a shortage of the sensitivity because the photosensitive material cannot sufficiently absorb the light incident thereon. In particular, photothermographic materials using highly lipophilic binders are deficient in sensitivity unless dyes are added thereto in sufficient amounts, because the adsorption of dyes to silver halide as a photosensitive element is weak therein.

SUMMARY OF THE INVENTION

Therefore, an object of the present invention is to provide an infrared-sensitive photothermographic material having satisfactory keeping properties, low fog and high sensitivity.

The above object of the present invention is attained with the means described below:

(1) A photothermographic material having light-sensitive silver halide grains on at least one side of a support, with the photothermographic material containing a dye represented by the following formula (I) or (II):

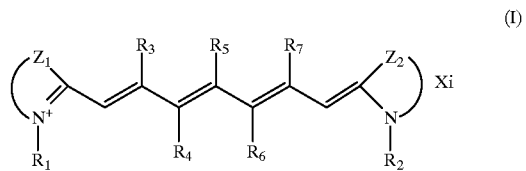

wherein $R_1$ and $R_2$ each represents a carboxyalkyl group containing 2 to 5 carbon atoms, the carboxy moiety of which has the undissociated form of COOH or the ionic form of COO$^-$; two substituents selected from among $R_3$, $R_4$, $R_5$, $R_6$ and $R_7$ so as to form a couple of $R_3$ and $R_5$, a couple of $R_4$ and $R_6$ or a couple of $R_5$ and $R_7$ represent groups for forming a 5- or 6-membered ring by combining with each other, and each of the substituents except those participating in the ring formation represents a hydrogen atom, a lower alkyl group or a phenyl group; $Z_1$ and $Z_2$ each represents an atomic group for completing a 5- or 6-membered nitrogen-containing heterocyclic ring; and X represents a counter ion for adjusting the charge balance;

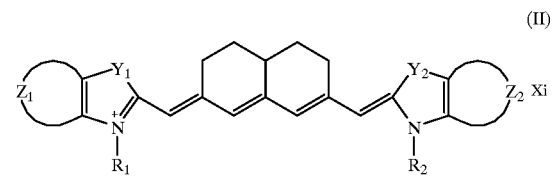

wherein $Y_1$ representsn oxygen atom, a sulfur atom, a selenium atom, NR or —CR'=CR"—; R represents a lower alkyl group; R' and R" each represents a hydrogen atom or an alkyl group; $Y_2$ represents an oxygen atom, a selenium atom, NR or —CR'=CR"—; $Z_1$ and $Z_2$ each represents a nonmetal atomic group for completing a benzene or naphthalene ring; X represents a counter ion for adjusting the charge balance; i represents 0 or 1; $R_1$ and $R_2$ each represents a carboxyalkyl group whose carboxy moiety has the undissociated form of COOH or the ionic form of COO$^-$.

(2) A photothemographic material having on at least one side of a support a binder, an organic silver salt, a reducing agent for silver ions and light-sensitive silver halide grains, with the photothermographic material containing a dye represented by the following formula (I) or (II):

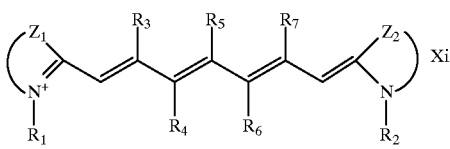

wherein $R_1$ and $R_2$ each represents a carboxyalkyl group having 2 to 5 carbon atoms, the carboxy moiety of which has the undissociated form of COOH or the ionic form of COO$^-$; two substituents selected from among $R_3$, $R_4$, $R_5$, $R_6$ and $R_7$ so as to form a couple of $R_3$ and $R_5$, a couple of $R_4$ and $R_6$ or a couple of $R_5$ and $R_7$ represent groups for forming a 5- or 6-membered ring by combining with each other, and each of the substituents except those participating in the ring formation represents a hydrogen atom, a lower alkyl group or a phenyl group; $Z_1$ and $Z_2$ each represents an atomic group for completing a 5- or 6-membered nitrogen-containing heterocyclic ring; and X represents a counter ion for adjusting the charge balance;

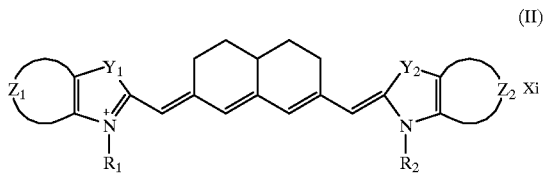

wherein $Y_1$ represents an oxygen atom, a sulfur atom, a selenium atom, NR or —CR'=CR"—, wherein R is a lower alkyl group and R' and R" each represents a hydrogen atom or an alkyl group; $Y_2$ represents an oxygen atom, a selenium atom, NR or —CR'=CR"—, wherein R is a lower alkyl group and R' and R" each represents a hydrogen atom or an alkyl group; $Z_1$ and $Z_2$ each represents a nonmetal atomic group for completing a benzene or naphthalene ring; X represents a counter ion for adjusting the charge balance; i represents 0 or 1; $R_1$ and $R_2$ each represents a carboxyalkyl group, the carboxy moiety of which has the undissociated form of COOH or the ionic form of COO$^-$.

DETAILED DESCRIPTION OF THE INVENTION

One of the sensitizing dyes used in the present invention is represented by the following formula (I):

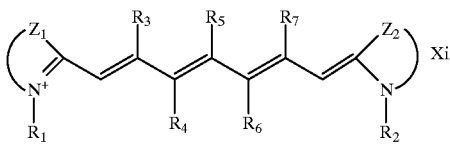

wherein $R_1$ and $R_2$ each represents a carboxyalkyl group containing 2 to 5 carbon atoms, the carboxy moiety of which may have either form, the undissociated (COOH) or ionic (COO$^-$) form; two substituents selected from among $R_3$, $R_4$, $R_5$, $R_6$ and $R_7$ so as to form a couple of $R_3$ and $R_5$, a couple of $R_4$ and $R_6$ or a couple of $R_5$ and $R_7$ represent groups for forming a 5- or 6-membered ring by combining with each other, and each of the substituents except those participating in the ring formation represents a hydrogen atom, a lower alkyl group or a phenyl group; $Z_1$ and $Z_2$ each represents an atomic group for completing a 5- or 6-membered nitrogen-containing heterocyclic ring; and X represents a counter ion for adjusting the charge balance.

The alkyl moiety of a carboxyalkyl group represented by each of $R_1$ and $R_2$ may have any of a straight-chain, branched and cyclic forms, but the straight-chain form is desirable therefor. Further, the alkyl moiety may have a substituent. Suitable examples of such a substituent include a carboxyl group, a halogen atom (F, Cl, Br or I), a cyano group, a hydroxyl group, an acyl group containing 1 to 4 carbon atoms and an alkoxy group containing 1 to 4 carbon atoms. In particular, it is desirable for the carboxyalkyl group to be an unsubstituted carboxyalkyl group, with examples including a carboxymethyl group, a carboxyethyl group, a carboxypropyl group and a carboxybutyl group.

The 5- or 6-membered ring formed by coupling $R_3$ with $R_5$, $R_4$ with $R_6$, or $R_5$ with $R_7$ may be a carbon ring or a heterocyclic ring containing an oxygen, nitrogen or sulfur atom as a hetero atom, and may have a substituent group. This ring is preferably a carbon ring, and may have no subutituent group or be substituted with an alkyl group containing 1 to 4 carbon atom, an alkenyl group containing 2 to 6 carbon atoms, an aralkyl group containing 7 to 11 carbon atoms, or a substituted or unsubstituted phenyl group containing 6 to 10 carbon atoms. Among the substituents $R_3$, $R_4$, $R_5$, $R_6$ and $R_7$, the substituents except those participating in the ring formation are each a hydrogen atom, an alkyl group containing 1 to 4 carbon atoms or a phenyl group, preferably a hydrogen atom, a methyl group or a phenyl group.

As examples of a 5- or 6-membered nitrogen-containing heterocyclic ring completed by $Z_1$ and $Z_2$ each, mention may be made of the rings recited below. In the following recitation, however, every ring in conveniently written by the name of the corresponding ring of non-ionic form although it actually has the form of quaternary salt.

Specifically, those rings include thiazole nuclei (e.g. thiazole, 4-methylthiazole, 4-phenylthiazole, 4,5-dimethylthiazole, 4,5-diphenylthiazole), benzothiazole nuclei (e.g., benzothiazole, 4-chlorobenzothiazole, 5-chlorobenzothiazole, 6-chlorobenzothiazole, 5-nitrobenzothiazole, 4-methylbenzothiazole, 5-methylbenzothiazole, 6-methylbenzothiazole, 5-bromobenzothiazole, 6-bromobenzothiazole, 5-iodobenzothiazole, 5-phenylbenzothiazole, 5-methoxybenzothiazole, 6-methoxybenzothiazole, 5-ethoxybenzothiazole, 5-ethoxycarbonylbenzothiazole, 5-carboxybenzothiazole, 5-phenetylbenzothiazole, 5-fluorobenzothiazole, 5-chloro-6-methylbenzothiazole, 5,6-dimethylthiobenzothiazole, 5,6-dimethylbenzothiazole, 5-hydroxy-6-methylbenzothiazole, tetrahydrobenzothiazole, 4-phenylbenzothiazole), naphthothiazole nuclei (e.g., naphtho[2,1-d]thiazole, naphtho[1,2-d]thiazole, naphtho[2,3-d]thiazole, 5-methoxynaphtho[1,2-d]thiazole, 7-ethoxynaphtho[2,1-d]thiazole, 8-methoxynaphtho[2,1-d]thiazole, 8-methylthionaphtho[1,2-d]thiazole, 5-methoxynaphtho[2,3-d]thiazole), thiazoline nuclei (e.g., thiazoline, 4-methylthiazoline, 4-nitrothiazoline), oxazole nuclei (e.g., oxazole, 5-methyloxazole, 4-nitrooxazole, 5-methyloxazole, 4-phenyloxazole, 4,5-diphenyloxazole, 4-ethyloxazole), benzoxazole nuclei (e.g., benzoxazole, 5-chlorobenzoxazole, 5-methylbenzoxazole, 5-bromobenzoxazole, 5-fluorobenzoxazole, 5-phenylbenzoxazole, 5-methoxybenzoxazole, 5-bromobenzoxazole, 5-trifluoromethylbenzoxazole, 5-hydroxybenzoxazole, 5-carboxybenzoxazole, 6-methylbenzoxazole, 6-chlorobenzoxazole, 6-nitrobenzoxazole, 6-methoxybenzoxazole, 6-hydroxybenzoxazole, 5,6-dimethylbenzoxazole, 4,6-dimethylbenzoxazole, 5-ethoxybenzoxazole), naphthoxazole nuclei (e.g., naphtho[2,1-d]oxazole, naphtho[1,2-d] ozaxzole, naphtho[2,3-d]oxazole, 5-methoxynaphtho[2,1-d] oxazole), oxazoline nuclei (e.g., 4,4-dimethyloxazoline), selenazole nuclei (e.g., 4-methylselenazole, 4-nitroselenazole, 4-phenylselenazole), benzoselenazole nuclei (e.g., benzoselenazole, 5-chlorobenzoselenazole, 6-methylbenzoselenazole, 6-methoxybenzoselenazole, 5-hydroxybenzoselenazole, 6-nitrobenzoselenazole, 5-chloro-6-methoxybenzoselenazole), naphthoselenazole nuclei (e g., naphtho[2,1-d]selenazole, naphtho[1,2-d] selenazole), 3,3-dialkylindolenine nuclei (e.g , 3,3-diethylindolenine, 3,3-diethylindolenine, 3,3-dimethyl-5-cyanoindolenine, 3,3-dimethyl-6-nitroindolenine, 3,3-dimethyl-5-nitroindolenine, 3,3-dimethyl-5-methoxyindolonine, 3,3,5-trimethylindolenine, 3,3-dimethyl-5-chloroindolenine), imidazole nuclei (e.g., 1-alkylimidazoles, 1-alkyl-4-phenylimidazoles, 1-alkylbenzimidazoles, 1-alkyl-5-chlorobenzimidazoles, 1-alkyl-5,6-dichlorobenzimidazoles, 1-alkyl-5-methoxybenzimidazoles, 1-alkyl-5-cyanobenzimidazoles, 1-alkyl-5-fluorobenzimidazoles, 1-alkyl-5-trifluoromethylbenzimidazoles, 1-alkyl-6-chloro-5-cyanobanzimidazoles, 1-alkyl-6-chloro-5-trifluoromethylbenzimidazoles, 1-alkylnaphtho[1,2-d] imdazoles, 1-allyl-5,6-dichlorobenzimidazole, 1-allyl-5-chlorobenzimidazole, 1-arylimidazoles, 1-arylbenzimidazoles, 1-aryl-5-chlorobenzimidazoles, 1-aryl-5,6-dichlorobenzimidazoles, 1-aryl-5-methoxybenzimidazoles, 1-aryl-5-cyanobenzimidazoles and 1-arylnaphtho[1,2-d]imidazoles, wherein the alkyl groups an substituents of the above-cited heterocyclic nuclei are preferably those containing 1 to 8 carbon atoms, including unsubstituted alkyl groups, e.g., methyl, ethyl, propyl, isopropyl, butyl, etc., and hydroxyalkyl groups, e.g., 2-hydroxyethyl, 3-hydroxypropyl, etc., particularly preferably methyl and ethyl groups, and the aryl groups as substituents of the above-cited heterocyclic nuclei are preferably a phenyl group, a halogen(e.g., chloro)-substituted phenyl group, an alkyl(e.g., methyl)-substituted phenyl group and an alkoxy(e.g., methoxy)-substituted phenyl group), pyridine nuclei (e.g., 2-pyridine, 4-pyridine, 5-methyl-2-pyridine, 3-methyl-4-pyridine), quinoline nuclei (e.g., 2-quinoline, 3-methyl-2-quinoline, 5-ethyl-2-quinoline, 6-methyl-2-quinoline, 6-nitro-2-quinoline, 8-fluoro-2-quinoline, 6-methoxy-2-quinoline, 6-hydroxy-2-quinoline, 8-chloro-2-quinoline, 4-quinoline, 6-ethoxy-4-quinoline, 6-nitro-4-quinoline, 8-chloro-4-quinoline, 8-fluoro-4-quinoline, 8-methyl-4-quinoline, 6-ethoxy-4-quinoline, isoquinoline, 6-nitro-1-isoquinoline, 3,4-dihydro-1-isoquinoline, 6-nitro-3-isoquinoline), imidazo[4,5-b] quinoxaline nuclei (e.g., 1,3-diethylimidazo[4,5-b] quinoxaline, 6-chloro-1,3-diallylimidazo[4,5-b] quinoxaline), benzotellurazole nuclei (e.g., benzotellurazole, 5-methylbenzotellurazole, 5-methoxybenzotellurazole), naphthotellurazole nuclei (e.g., naphtho[1,2-d]tellurazole), oxodiazole nuclei, thiadiazole nuclei, tetrazole nuclei and pyrimidine nuclei.

Preferably, the atomic group represented by $Z_1$ or $Z_2$, which completes a 5- or 6-membered nitrogen-containing heterocyclic ring, are those completing an unsubstituted or substituted benzothiazole, benzoxazole, benzimidazole, naphthoxazole, naphthothiazole or quinoline nucleus.

The nonmetal atomic group which is represented by $Z_1$ or $Z_2$ and completes a 5- or 6-membered nitrogen-containing heterocyclic ring may have a substituent group. Examples of such a substituent group include a $C_{1-8}$ alkyl group (such as methyl, ethyl, trifluoromethyl, propyl or isopropyl group), a halogen atom (such as fluorine, chlorine, bromine or iodine atom), an aryl group (such as phenyl, chlorophenyl, bromophenyl, methylphenyl or methoxyphenyl group), an alkoxy group (such an methoxy, ethoxy, propoxy, butoxy, benzyloxy, 2-methoxyethoxy, 2-hydroxyethoxy or 2-methoxy-2-methylethoxy group), an alkoxycarbonyl group (such as methoxycarbonyl, ethoxycarbonyl or benzyloxycarbonyl group), a cyano group, a nitro group and a hydroxy group.

The counter ion represented by X is a cation or anion chosen so as to adjust the total charge of the compound of formula (I) to zero, and it may be present an the substituent in $Z_1$, $Z_2$, $R_1$, $R_2$ or the like. As for the cation suitable for X, sodium ion, potassium ion, ammonium ion, tetrabutylammonium ion and N-ethylpyridinium ion are examples thereof. As for the anion suitable for X, chloride, bromide, iodide, tetrafluoroborate, hexafluorophosphate, 4-methylbenzenesulfonate, 4-chlorobenzenesulfonate, benzenesulfonate, methanesulfonate, trifluoromethanesulfonate and like acid anions are examples thereof.

With respect to the combination of $R_1$–$R_7$, $Z_1$ and $Z_2$, it is desirable that $R_1$ and $R_2$ each independently represents a carboxypropyl or carboxybutyl group, $R_3$ and $R_5$ combine with each other to form a 5- or 6-membered ring, $R_4$, $R_6$ and $R_7$ each represents a hydrogen atom and $Z_1$ and $Z_2$ each represents a member of a thiazole nucleus.

Specific examples of a compound represented by formula (I) used in the present invention are illustrated below, but these examples should not be construed as limiting the scope of the invention in any way.

D-1

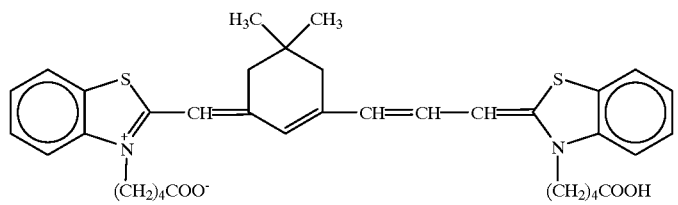

-continued
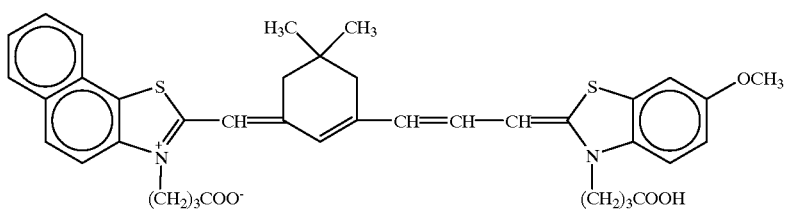
D-2
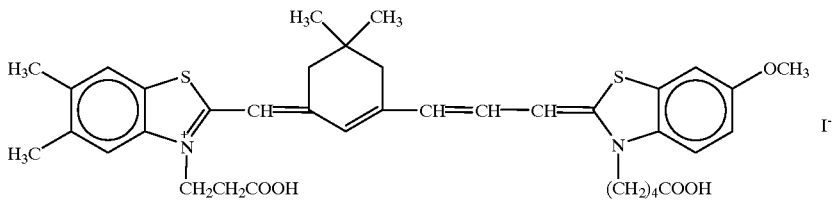
D-3
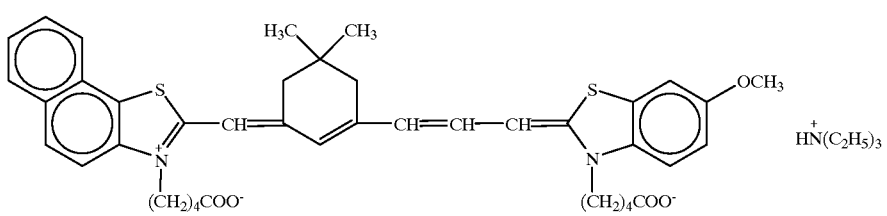
D-4
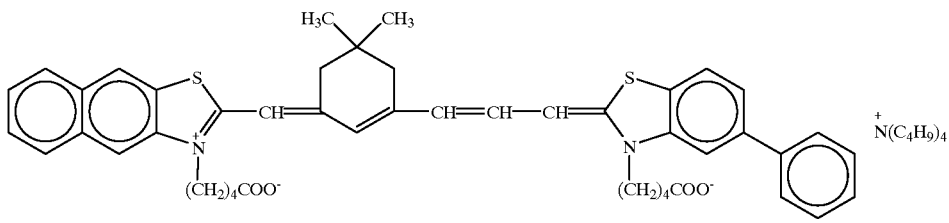
D-5
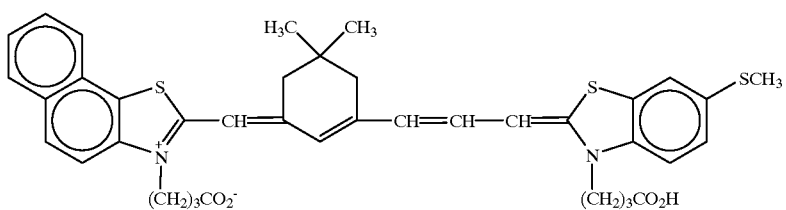
D-6
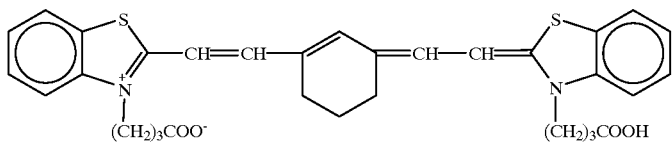
D-7
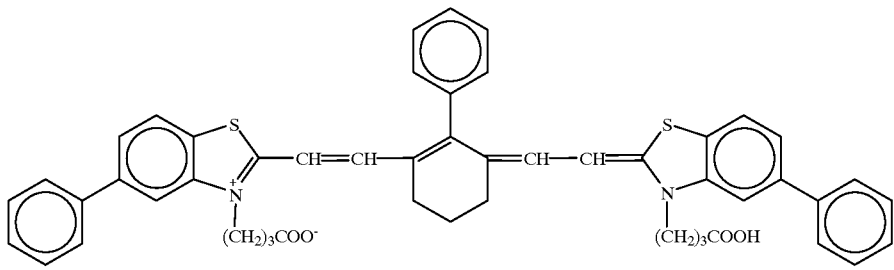
D-8

-continued
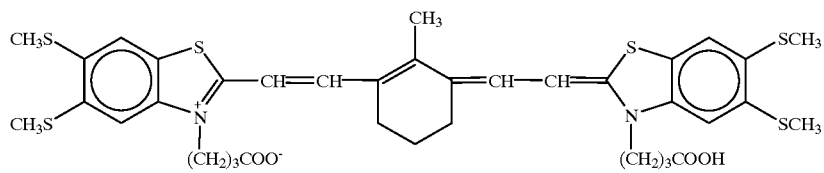
D-9
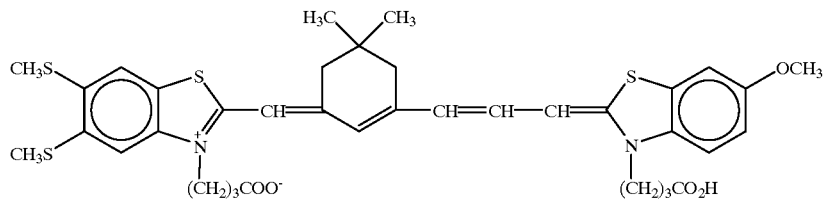
D-10
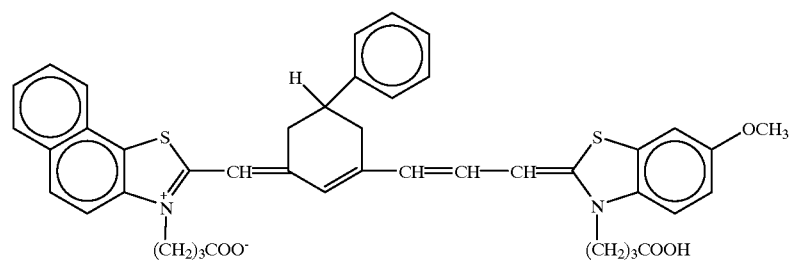
D-11
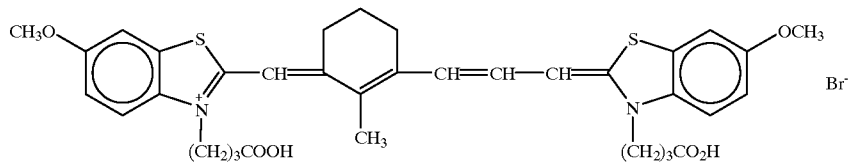
D-12
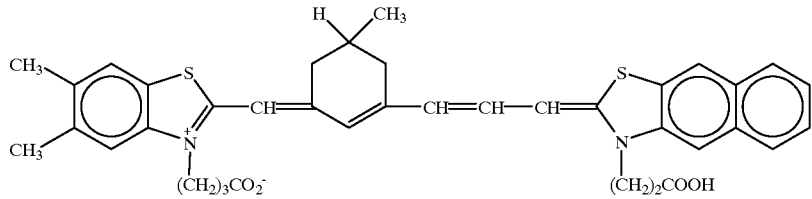
D-13
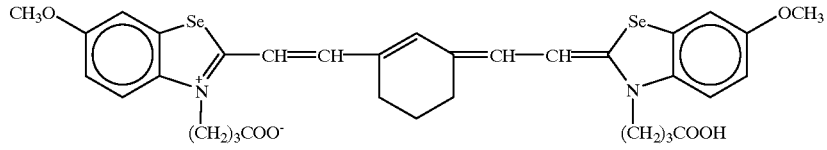
D-14
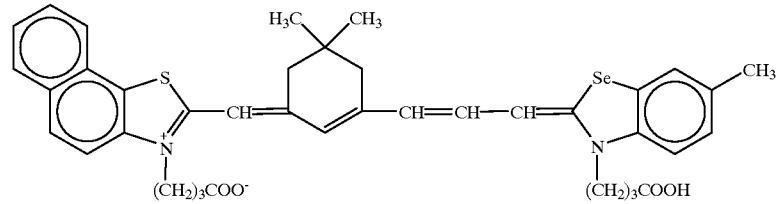
D-15

-continued
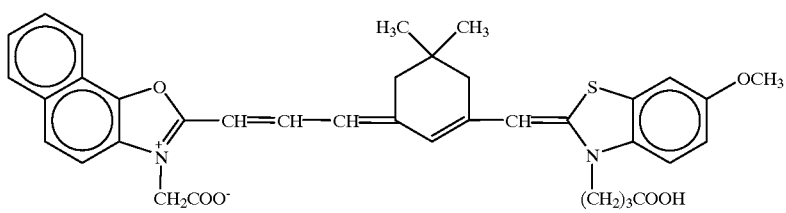
D-16
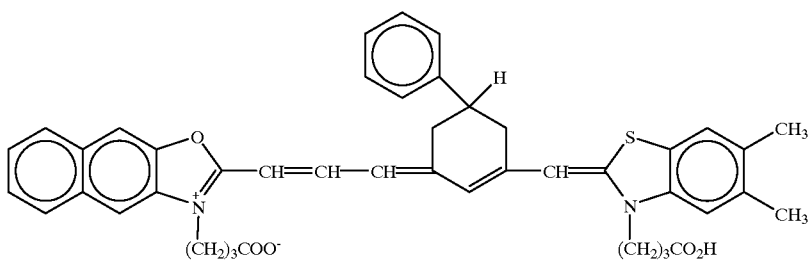
D-17
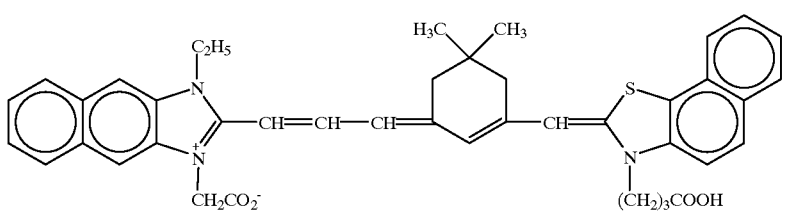
D-18
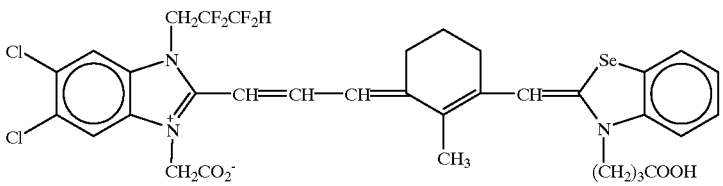
D-19
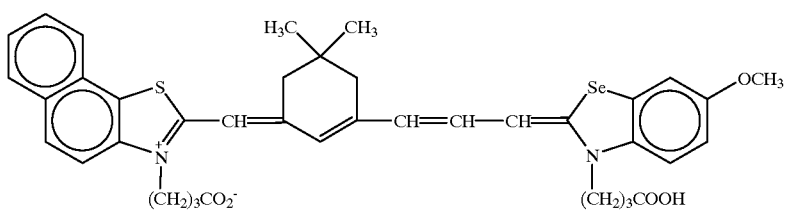
D-20
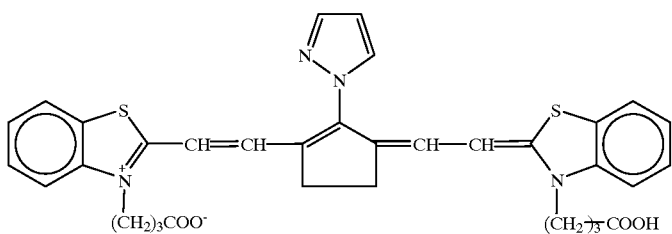
D-21
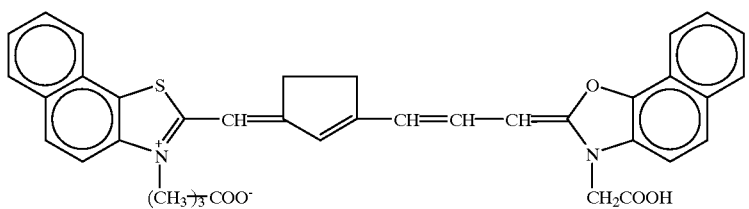
D-22

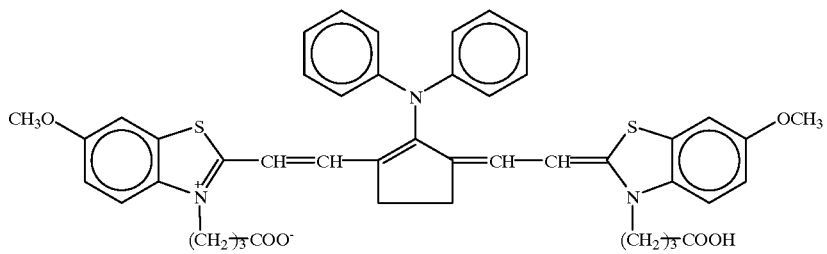

D-23

Another sensitizing dye used in the present invention is represented by the following formula (II):

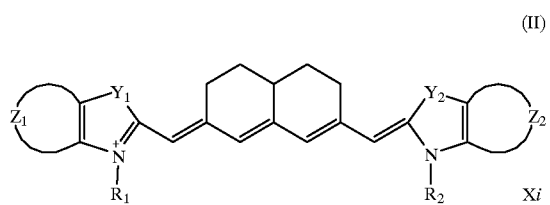

(II)

wherein $Y_1$ represents an oxygen atom, a sulfur atom, a selenium atom, NR (wherein R is a lower alkyl group) or —CR'=CR"— (wherein R' and R" each represents a hydrogen atom or an alkyl group); $Y_2$ represents an oxygen atom, a selenium atom, NR (wherein R is a lower alkyl group) or —CR'=CR"— (wherein R' and R" each are a hydrogen atom or an alkyl group); $Z_1$ and $Z_2$ each represents a nonmetal atomic group for completing a benzene or naphthalene ring; X represents a counter ion for adjusting the charge balance; i represents 0 or 1; $R_1$ and $R_2$ each represents a carboxyalkyl group, the carboxy moiety of which may have either the undissociated form of COOH or the ionic form of COO$^-$.

The lower alkyl group represented by R in formula (I) is a straight-chain or branched alkyl group containing 1 to 4 carbon atoms, and may have a substituent. Suitable examples of such a substituent include a fluorine atom, a chlorine atom, a cyano group, a hydroxyl group, a carboxyl group and an alkoxy group containing 1 to 4 carbon atoms. In particular, it is desirable for the group represented by R to be a methyl group, an ethyl group, a propyl group, a $C_{1-3}$ alkyl group substituted with fluorine atom(s), a methoxyethyl group, an ethoxyethyl group, a carboxymethyl group, a carboxyethyl group or a carboxypropyl group.

Each of the substituents R' and R" in formula (II) represents a hydrogen atom or an alkyl group, preferably a hydrogen atom or a straight-chain or branched alkyl group containing 1 to 8 carbon atom, and particularly preferably a hydrogen atom or an alkyl group containing 1 to 4 carbon atoms. In addition, the alkyl group represented by R' or R" may have a substituent. Suitable examples of such a substituent include a fluorine atom, a chlorine atom, a cyano group, a hydroxyl group, a carboxyl group and a $C_{1-4}$ alkoxy group. As specific examples of R' and R" each, mention may be made of a hydrogen atom, a methyl group, an ethyl group, a propyl group, a $C_{1-3}$ alkyl group substituted with fluorine atom(s), a methoxyethyl group, an ethoxyethyl group, a carboxymethyl group, a carboxyethyl group and a carboxypropyl group.

The carboxyalkyl group represented by $R_1$ and $R_2$ in formula (II) each in preferably a carboxyalkyl group containing 2 to 22 carbon atoms, and it may have other substituents besides the carboxyl group. As for the other substituents, a halogen atom (F, Cl, Br or I), a hydroxyl group, a cyano group and an alkoxy group containing 1 to 4 carbon atoms are examples thereof. However, the carboxyalkyl group preferred as $R_1$ and $R_2$ each in an carboxyalkyl group which does not have a substituent other than carboxyl group. In particular, an unsubstituted carboxyalkyl group containing 2 to 6 carbon atoms (such an carboxymethyl, carboxyethyl, carboxypropyl or carboxybutyl) is preferred over the others.

The benzene or naphthalene ring completed by $Z_1$ and $Z_2$ in formula (II) each may further have a substituent. Suitable examples of such a substituent include a $C_{1-6}$ alkyl group, a $C_{6-20}$ phenyl group having a substituent (preferably a halogen atom, an alkoxy group, an alkyl group, an alkylthio group, a carboxyalkyl group or a carboxyl group), a phenyl group, a $C_{1-6}$ alkoxy group, a $C_{1-6}$ alkylthio group and a halogen atom (F, Cl, Br, I). The fused site in the naphthalene ring completed by $Z_1$ or $Z_2$ may be any of the sites [1,2-d], [2,3-d] and [3,4-d].

As for the combination of $Y_1$, $Y_2$, $Z_1$ and $Z_2$ in formula (II), the combination in which $Y_1$ is a sulfur atom and $Y_2$ is an oxygen atom in desirable, and the combination in which at least either $Z_1$ or $Z_2$ completes a substituted or unsubstituted naphthalene ring besides the foregoing restriction on $Y_1$ and $Y_2$ in more desirable.

The counter ion represented by X in formula (II) is a cation or anion chosen so as to adjust the total charge of the compound of formula (II) to zero, and it may be present as a substituent in $Z_1$, $Z_2$, $R_1$, $R_2$ or the like. As for the cation suitable for X, sodium ion, potassium ion, ammonium ion, tetrabutylammonium ion and N-ethylpyridinium ion are examples thereof. As for the anion suitable for X, chloride, bromide, iodide, tetrafluoroborate, hexafluorophosphate, 4-methylbenzenesulfonate, 4-chlorobenzenesulfonate, benzenesulfonate, methansulfonate, trifluoromethanesulfonate and like acid anions are examples thereof.

Specific examples of a compound represented by formula (II) used in the present invention are illustrated below, but these examples should not be construed as limiting the scope of the invention in any way.

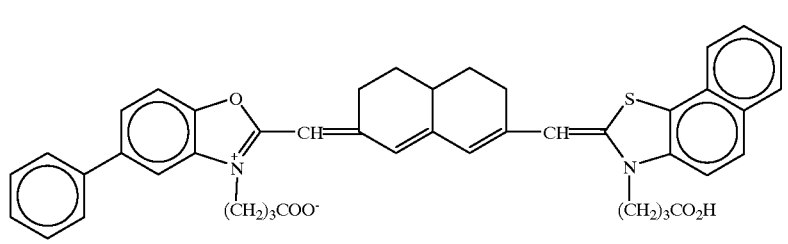
D-1'
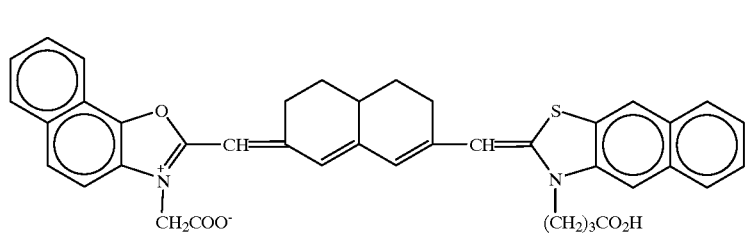
D-2'
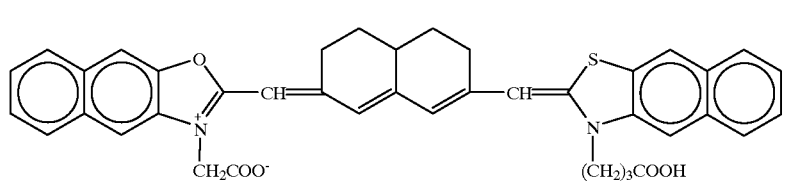
D-3'
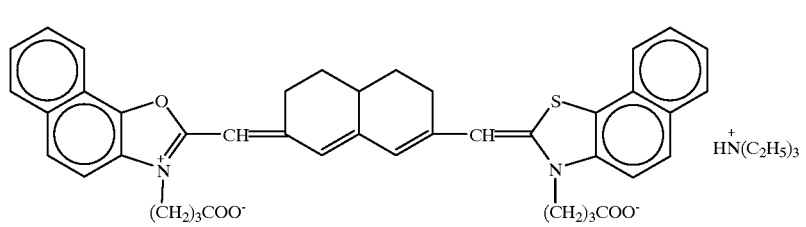
D-4'
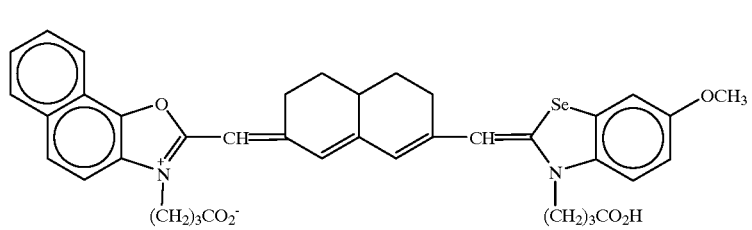
D-5'
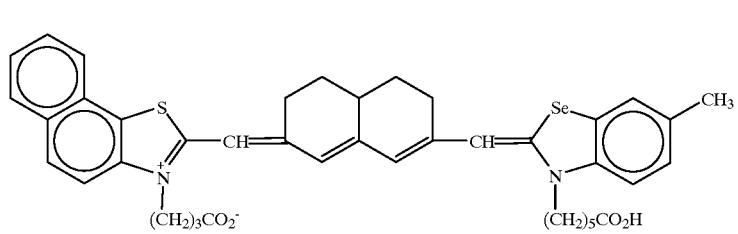
D-6'
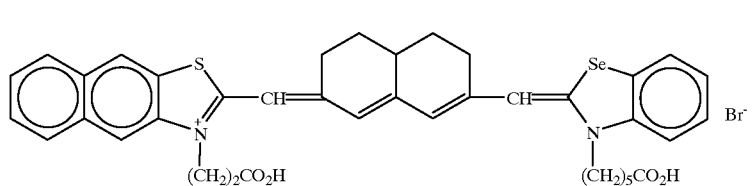
D-7'

-continued
D-8'
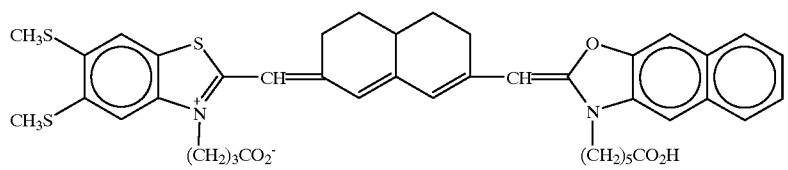
D-9'
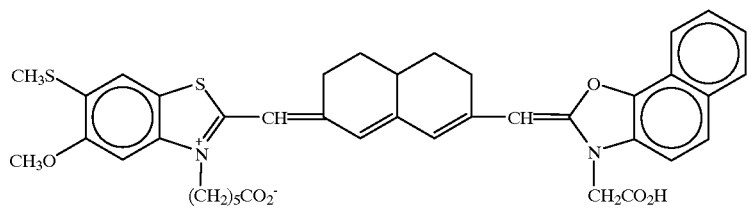
D-10'
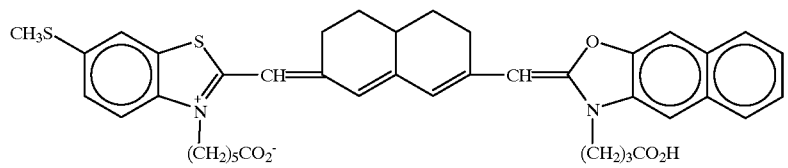
D-11'
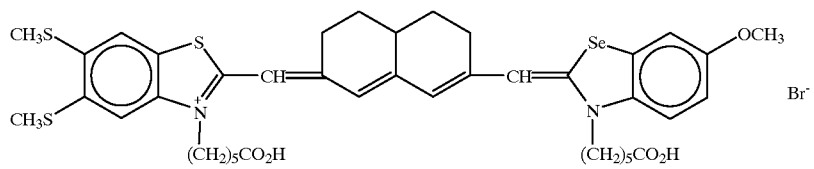
Br⁻
D-12'
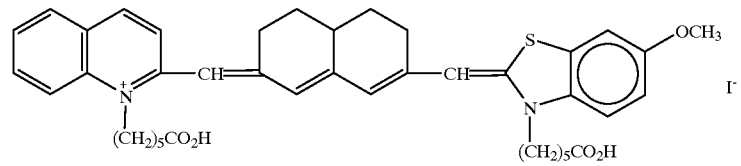
I⁻
D-13'
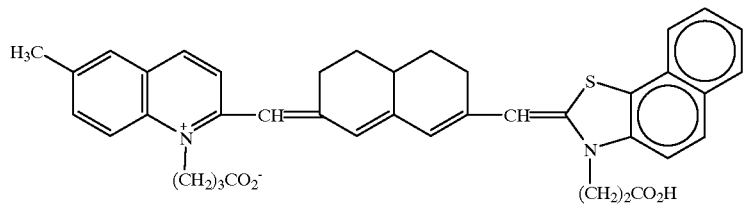
D-14'
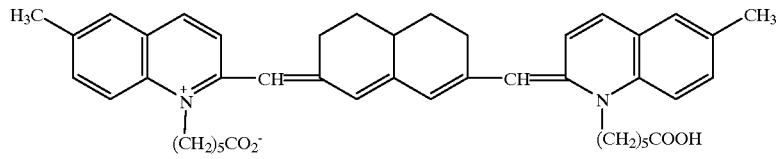
D-15'
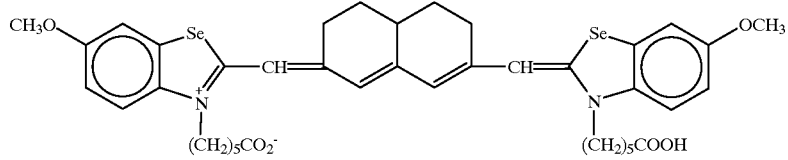

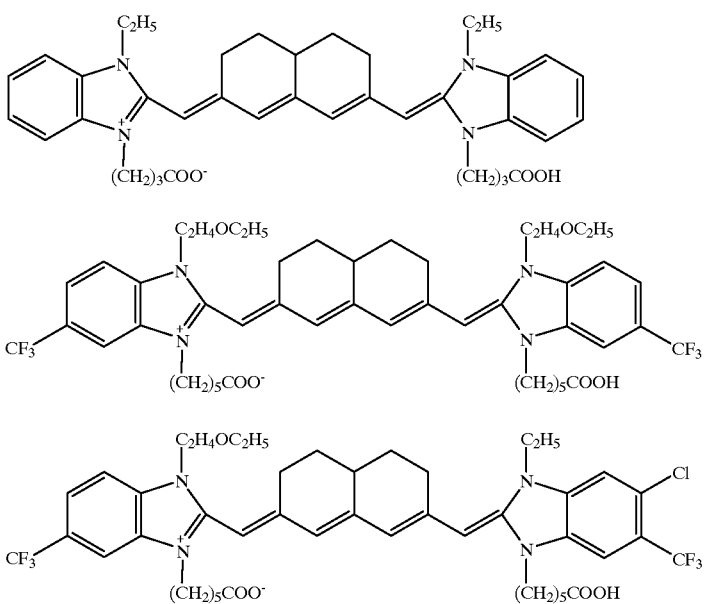

D-16'

D-17'

D-18'

[化10]

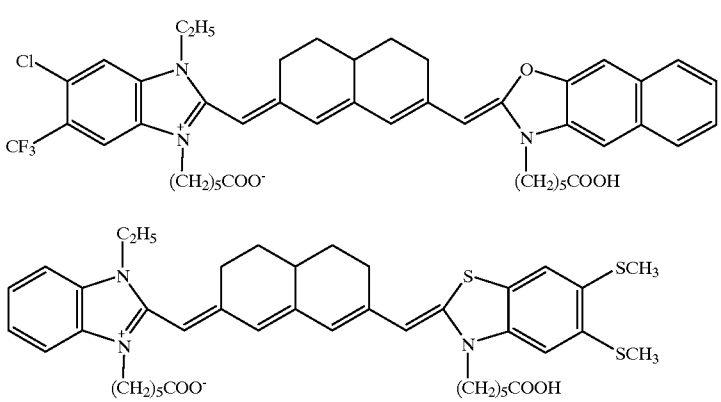

D-19'

D-20'

The present compounds represented by formula (I) or (II) can be synthesized according to the methods described in the following books or the references cited therein. Those books are, e.g., F. M. Hamer, *The Cyanine Dyes and Related Compounds*, from page 55 on, Interscience Publishers, New York (1964); Nicoli Tuturkov, Yurgen Fabian, Akime Merhorn, Flitz Dietz & Alia Dagiel, *Polymethine Dyes*, pages 23–38, Thankmetry Aulizki University Press, Sophia; *Heterocyclic Compounds—Special Topic in Heterocyclic Chemistry*, Chapter 18, Section 14, pages 482–515, John Wiley & Sons Co., New York, London (1977); and *Rods Chemistry of Carbon Compounds*, 2nd Ed. Vol. IV, Part B, Chapter 15, pages 269–422 (1977), and 2nd Ed. Vol. IV, Part B, Chapter 15, pages 267–296 (1985), Ersbayer Science Public Company Inc., New York.

The present photothermographic emulsion is applied to a support in the form of single or multiple layer. At least one constituent layer of the emulsion layer must comprise silver halide, and it is desirable for the constituent layer to further comprise the ingredients requested, such as an organic silver malt, a developer, a binder and auxiliary agents including a toning agent and a coating aid. When the emulsion layer has a double-layer structure, an organic silver salt and silver halide are contained in the first emulsion layer (which in generally adjacent to a support), while other ingredients besides those silver salts are contained in the second layer or in both the first and second layers. Further, the double-layer structure may be made up of a single emulsion layer containing all the ingredients and a protective top coat. With respect to the structure of a multispectral sensitive photothermographic material, either combination of two layers as mentioned above may be employed for each color, or a single layer may contain all the ingredients as described in U.S. Pat. No. 4,708,928. In a many dyes-added multispectral sensitive photothermographic material, as described in U.S. Pat. No. 4,460,681, each emulsion layer is generally held distinguishably from any other emulsion layer by providing a functional or non-functional barrier layer between every adjacent light-sensitive layers.

It is desirable that the present sensitizing dye be used in an amount of from 1 μmole to 1 mole per mole of silver halide. Preferably, the amount of the present sensitizing dye used is from 10 μmole to 10 mmole. As for the manner of adding the present sensitizing dye, the addition may be carried out at any stage during the period from the silver halide formation to just before the coating operation. However, it is desirable for the sensitizing dye to be added just before the coating.

In order to achieve the desired spectral sensitization spectrum, the sensitizing dyes according to the present invention can also be used as the mixture of two or more thereof.

Besides the present sensitizing dyes having the structural formulae (I) and (II), other sensitizing dyes may be used together. Of the dyes unable together with the present sensitizing dyes, those which can confer spectral sensitivities upon silver halide grains at some wavelengths in the range of 750 mm to 1,400 nm by the adsorption to the silver halide grains are preferable. Specifically, various known dyes, including cyanine dyes, merocyanine dyes, styryl dyes, hemicyanine dyes, oxonol dyes, hemioxonol dyes and xanthene dyes, can be used to advantage in spectrally sensitizing light-sensitive silver halide. As for the cyanine dyes, those having basic nuclei, such as thiazoline, oxazoline, pyrroline, pyridine, oxazole, thiazole, selenazole and imidazole nuclei, are useful. As for the useful merocyanine dyes, acidic nuclei such as thiohydantoin, rhodanine, oxazolidinedione, thiazolinedione, barbituric acid, thiazolinone, malononitrile and pyrazolone nuclei are contained therein in addition to the basic nuclei as recited above. Of the foregoing cyanine and merocyanine dyes, those containing imino or carboxyl groups are especially effective. More specifically, the dyes used together with the present sensitizing dyes may be properly selected from the known dyes as described in U.S. Pat. Nos. 3,761,279, 3,719,495 and 3,877,943, British Patents 1,466,201, 1,469,117 and 1,422,057, JP-B-03-10391, JP-B-06-52387, JP-A-05-341432, JP-A-06-194781 and JP-A-06-301141. In general, such dyes can be used in an amount of from about 10 μmole to about 1 mole per mole of silver halide. Additionally, those dyes also can be used as a mixture of two or more thereof for the achievement of the desired spectral sensitization.

It is desirable for the present photothermographic material to be a photosensitive material which has on one side thereof at least one light-sensitive layer comprising a silver halide emulsion and on the other side a backing layer, namely the so-called single-sided photosensitive material.

In forming the light-sensitive silver halide contained in the present photothermographic material, methods well known in the art, e.g., the methods described in *Research Disclosure*, No. 17029 (June, 1978) and U.S. Pat. No. 3,700,458, can be adopted. More specifically, the present invention can employ the method of adding a halogen-containing compound to the prepared organic silver salt to convert a part of the silver of the organic silver salt into the light-sensitive silver halide, or the method of preparing light-sensitive silver halide grains by the addition of a silver-supplying compound and a halogen-supplying compound to a solution of gelatin or another polymer and then mixing the prepared grains with an organic silver salt. In particular, the latter method is preferred in the present invention. As for the light-sensitive silver halide, smaller grains are desirable from the viewpoint of preventing the photosensitive material from becoming clouded after the image formation. specifically, it is desirable for the grain size to be not greater than 0.20 μm, preferably from 0.01 to 0.15 μm, particularly preferably from 0.02 to 0.12 μm. The term "grain size" used herein signifies "edge length" when the grains have a regular crystal form such as a cubic or octahedral form. In the case of tabular silver halide grains, the term "grain size" refers to the diameter of the circle having the same area as the projected area of the main face of each tabular grain. In cases where the silver halide grains have irregular crystal forms, such as spherical and rod-like forms, the term "grain size" means the diameter of the sphere having the same volume am each grain.

With respect to the form of silver halide grains, a cubic form, an octahedral form, a tabular form, a spherical form, a rod-like form and a potato-like form are examples thereof. In particular, cubic grains and tabular grains are preferred over the others in the present invention. When tabular silver halide grains are employed, it is desirable for the average aspect ratio thereof to be from 100 to 2, preferably from 50 to 3. Also, silver halide grains having round corners are preferably used in the present invention. The light-sensitive silver halide grains used in the present invention has no particular restriction as to the Miller indices of their outer surfaces. However, it is desirable that [100] plane be present in a high proportion, because a spectral sensitizing dye adsorbed to that plane has high spectral sensitizing efficiency. The appropriate proportion of [100] plans in not lower than 50%, preferably at least 65%, particularly preferably at least 80%. The proportion of [100] plane can be determined using the method described in T. Tani, *J. Imaging Sci.*, 29, 165 (1995), wherein the difference between [111] plane and [100] plans in the adsorption of a sensitizing dye thereto in utilized. The light-sensitive silver halide used in the present invention has no particular restriction on halide composition, so that it may be any of silver chloride, silver chlorobromide, silver bromide, silver iodobromide, silver iodochlorobromide and silver iodide. However, silver bromide or silver iodobromide can be advantageously used in the present invention, wherein the suitable iodide content is from 0.1 to 40 mole %, preferably from 0.1 to 20 mole %. The halide composition may have a uniform distribution inside the grains, or it may change stepwise or continuously inside the grains. For instance, it is favorable to use silver iodobromide grains having a higher iodide content in the inner part thereof or silver halide grains having a core/shell structure. As for the grains having a core/shell structure, the core/shell grains having a double to quintuple structure, preferably a double to quadruple structure, can be used to advantage.

Further, it is desirable for the light-sensitive silver halide grains used in the present invention to contain at least one metal complex selected from the group consisting of rhodium complexes, rhenium complexes, ruthenium complexes, osmium complexes, iridium complexes, cobalt complexes and iron complexes. These metal complexes may be used alone or as a mixture of two or more of different complexes whose metal components may be the same or different. The suitable content of such metal complexes is from 1 nmole to 10 mmole, preferably from 10 nmole to 100 μmole, per mole of silver. With the respect to specific structures of such metal complexes, the metal complexes having the structures described in JP-A-07-225449 can be used to advantage. Of the cobalt complexes and iron complexes, hexacyanocobaltates and hexacyanoferrates are preferred over others. More specifically, ferricyanate ion, ferrocyanate ion and hexacyanocobaltate ions are used to advantage, but the metal complexes usable in the present invention should not be construed as being limited to those ions. The metal complexes as mentioned above may be incorporated uniformly in each silver halide grain or in a higher concentration in the core part than the shell part of each silver halide grain. There in no particular restriction on the way of incorporating those metal complex, though.

The light-sensitive silver halide grains can be desalted by the washing treatment according to a method well known in the art, such as a noodle method or a flocculation method. However, such a desalting process may be omitted in the present invention.

Furthermore, it is desirable that the light-sensitive silver halide-grains used in the present invention be chemically sensitized. For the chemical sensitization, as well known in the art, a sulfur sensitization method, a selenium sensitization method and a tellurium sensitization method can be employed. Also, a precious metal sensitization method using a gold, platinum, palladium or iridium compound and a reduction sensitization method can be adopted. Although the compounds known to be suitable for sulfur, selenium and tellurium sensitization methods can be used in the present invention also, the compounds described in JP-A-07-128768 can be used to greater advantage. As for the tellurium sensitizer, diacyltellurides, bis(oxycarbonyl)tellurides, bis(carbamoyl)tellurides, bis(oxycarbonyl)ditelluride, bis(carbamoyl)ditellurides, the compounds having P=Te bonding, tellurocarboxylates, Te-organyl tellurocarboxylic acid esters, di(poly)tellurides, tellurides, tellurols, telluroacetals, tellurosulfonates, the compound having P—Te bonding, tellurium-containing heterocyclic rings, tellurocarbonyl compounds, inorganic tellurium compounds and colloidal tellurium are specific examples thereof. As for the compounds suitably used for a precious metal sensitization method, chloroauric acid, potassium chloroaurate, potassium aurithiocyanate, gold sulfide, gold selenide and the compounds described in U.S. Pat. No. 2,448,060 and British Patent 618,061 are specific examples thereof. As specific examples of a compound suitable for reduction sensitization, mention may be made of ascorbic acid, thiourea dioxide, stannous chloride, aminoiminomethanesulfonic acid, hydrazine derivatives, borane compounds, silane compounds and polyamine compounds. In addition, the reduction sensitization can be effected by ripening emulsions under the pH of above 7 or the pAg of below 8.3. Also, the reduction sensitization can be attained by introducing the stage of single addition of silver ion in the course of the grain formation.

The amount of light-sensitive silver halide used in the present invention is preferably from 0.01 to 0.5 mole, more preferably from 0.02 to 0.3 mole, particularly preferably from 0.03 to 0.25 mole, per mole of organic silver salt. With respect to the way of and the condition for mixing the light-sensitive silver halide with an organic silver malt, the silver halide grains and the organic silver salt prepared independently may be mixed by means of a high-speed stirrer, a ball mill, a sand mill, a colloidal mill, a vibration mill, a homogenizer or the like, or the silver halide grains prepared separately may be added at due time during the preparation of an organic silver salt to prepare a mixture of the silver halide with the organic silver salt. However, the present invention has no particular restriction as to the mixing method and condition so far as the effects intended by the invention can be fully achieved.

The organic silver salts usable in the present invention are silver salts which, although they are relatively stable to light, can provide silver images when they are heated to 80° C. or higher in the presence of an exposed photocatalyst (e.g., a latent image formed from light-sensitive silver halide) and a reducing agent. And the organic silver salts may be any of organic substances containing roots capable of reducing silver ion. Of such silver salts, the silver salts of organic acids, especially the silver salts of long-chain aliphatic carboxylic acids (containing 10 to 30, preferably 15 to 28, carbon atoms), are used to advantage. In addition, the complexes of organic or inorganic silver slats whose ligands have complexation stability constants ranging from 4.0 to 10.0 are also favorable. The silver providing substances can preferably constitute about 5 to 30 weight % of the image-forming layer. The desirable organic silver salts include the silver malts of organic compounds containing carboxyl groups, wherein the silver salts of aliphatic carboxylic acids and those of aromatic carboxylic acids are included. However, the organic silver salts usable in the invention should not be construed an being limited to those salts. Suitable examples of a silver salt of aliphatic carboxylic acid include silver behenate, silver stearate, silver oleate, silver laurate, silver caproate, silver myristate, silver palmitate, silver maleate, silver fumarate, silver tartarate, silver linolate, silver butyrate, silver camphorate and a mixture of two or more thereof.

Also, the silver salts of mercapto or thione group-containing compounds and derivatives thereof can be used. Suitable examples thereof include the silver salt of 3-mercapto-4-phenyl-1,2,4-triazole, the silver salt of 2-mercpatobenzimidazole, the silver salt of 2-mercapto-5-aminothiadiazole, the silver salt of 2-(ethylglycolamido)benzothiazole, the silver salts of thioglycolic acids, such as a silver S-alkylthioglycolate (the alkyl moiety of which contains 12 to 22 carbon atoms), the silver salts of dithiocarboxylic acids, such as silver dithioacetate, the silver salts of thioamides, the silver salt of 5-carboxy-1-methyl-2-phenyl-4-thiopyridine, the silver salt of morcaptotriazine, the silver salt of 2-mercaptobenzoxazole, the silver salts described in U.S. Pat. No. 4,123,274 including the silver salts of 1,2,4-mercaptothiazole derivatives, such an the silver salt of 3-amino-5-benzylthio-1,2,4-thiazole, and the silver salts described in U.S. Pat. No. 3,301,678 including the silver salts of thione compounds, such as the silver salt of 3-(3-carboxyethyl)-4-methyl-4-thiazoline-2-thione. Further, imino group-containing compounds can be used, too. Suitable examples thereof include the silver salts of benzotriazoles and derivatives thereof, such as the silver salts of alkyl-substituted benzotriazoles (e.g., methylbenzotriazole silver) and the silver salts of halogen-substituted benzotriazoles (e.g., 5-chlorobenzotriazole silver); the silver salts of 1,2,4-triazoles or 1-H-tetrazoles as described in U.S. Pat. No. 4,220,709; and the silver salts of imidazole and imidazole derivatives. Furthermore, various silver acetylide compounds as described, e.g., in U.S. Pat. Nos. 4,761,361 and 4,775,613 can be used, too.

The organic silver salts usable in the present invention have no particular restriction on their crystal forms. However, it is desirable for them to be needle-like crystals having a minor axis and a major axis. As for their grain size, on the other hand, the organic silver salts are required to have small grain sizes. This is because the inversely proportional relation between the grain size of silver salt and the covering power thereof, which is well known in the field of silver halide potosensitive materials, is valid for the present photothermographic material also. In other words, if the organic silver salt to function as the image-forming element in the present photothermographic material are large in grain size, high image density cannot be obtained because of their low covering power. Accordingly, it is desirable that the minor axis be from 0.01 $\mu$m to 0.20 $\mu$m and the major axis be from 0.10 $\mu$m to 5.0 $\mu$m, and more desirable that the minor axis be from 0.01 $\mu$m to 0.15 $\mu$m and the major axis be from 0.10 $\mu$m to 4.0 $\mu$m. The size distribution among organic silver salt grains is preferably monodisperme. The term "monodisperse" as used herein means that, in the measurement of minor axis length and major axis length each, the standard deviation divided by the mean of measured values is, expressed in percentage, below 100%, preferably below 80%, particularly preferably below 50%. The measurements of organic silver salt grains can be examined by the observation of an organic silver salt dispersion under a transmission electron microscope. As for another method of examining the extent of monodispersion, there can be adopted the method of determining the standard deviation relating to the volume weighted-mean diameter of organic silver salt grains. Therein, it is desirable that the quotient of the standard deviation divided by the volume weighted-mean diameter (namely variation coefficient) be, expressed in percentage, below 100%, preferably below 80%, and more preferably below 50%. The standard deviation relating to the volume weighted-mean diameter can be determined, e.g., by irradiating an organic silver salt dispersed in a liquid with laser beam and determining the auto-correlation function of change in fluctuations of the scattered beam with the passage of time to obtain grain sises (volume weighted mean diameter).

The amount of an organic silver salt used in the present invention, though it is optional, in preferably from 0.1 to 5 g/m$^2$, and more preferably from 1 to 3 g/m$^2$.

The reducing agent for organic silver salts may be any of materials capable of reducing silver ion to metallic silver, preferably organic ones. Although conventional photographic developing agents, such as phenidone, hydroquinone and catechol are useful, hindered phenols are preferred as the reducing agent. The reducing agent is required to be present in a proportion of 1 to 10 weight % in the image-forming layer. When the reducing agent is added to a layer except emulsion layers in a multilayer structure, it is a desirable tendency to add the reducing agent in a greater proportion, specifically a proportion of about 2 to 15 weight %.

For the organic silver salt-utilized photothermographic materials, a wide variety of reducing agents are disclosed. Specific examples thereof include amidoximes, such an phenylamidoxime, 2-thienylamidoxime and p-phenoxyphenylamidoximel; azines, such as 4-hydroxy-3, 5-dimethoxybenzaldehydeazine; the combinations of aliphatic carboxylic acid arylhydrazides with ascorbic acid, such as the combination of 2,2-bis(hydroxymethyl) propionyl-β-phenylhydrazine with ascorbic acid; the combinations of polyhydroxybonzenes with hydroxylamines, reductones and/or hydrazines (e.g., the combination of hydroquinone with bis(ethoxyethyl)hydroxylamine, piperidinohexose reductone or formyl-4-methylphenylhydrazine); hydroxamic acids, such as phenylhydroxamic acid, p-hydroxyphenylhydroxamic acid and β-anilinehydroxamic acid; the combinations of azines with sulfonamidophenols (e.g., the combination of phenothiazine with 2,6-dichloro-4-benzenesulfonamidophenol); α-cyanophenylacetic acid derivatives, such as ethyl-α-cyano-2-methylphenylacetate, ethyl-α-cyanophenylacetate; bis-β-naphthols, such as 2,2-dihydroxy-1,1-binaphthyl, 6,6-dibromo-2,2-dihydroxy-1,1-binaphthyl and bis(2-hydroxy-1-naphthyl)methane; the combinations of bis-β-naphthols with a 2,4-dihydroxybenzene derivative (such as 2,4-dihydroxybenzophenone or 2,4-dihydroxyacetophenone); 5-pyrazolones, such as 3-methyl-1-phenyl-5-pyrazolone; reductones, such as dimethylazinohexose reductone, anhydrodihydroaminohexose reductone and anhydrodihydropiperidonehexose reductone; sulfonamidophenol reducing agents, such as 2,6-dichloro-4-benzenesulfonamidophenol and p-benzenesulfonamidophenol; 2-phenylindane-1,3-dione and the like; chromans, such as 2,2-dimethyl-7-t-butyl-6-hydroxychroman; 1,4-dihydropyridines, such as 2,6-dimethoxy-3,5-dicarboethoxy-1,4-dihydropyridine; bisphenols, such as bis(2-hydroxy-3-t-butyl-5-methylphenyl)methane, 2,2-bis(4-hydroxy-3-methylphenyl) propano, 4,4-ethylidene-bis(2-t-butyl-6-methylphenol), 1,1-bis(2-hydroxy-3,5-dimethylphenyl)-3,5,5-trimethylhexane and 2,2-bis(3,5-dimethyl-4-hydroxyphenyl)propane; ascorbic acid derivatives, such as 1-ascorbyl palmitate and ascorbyl stearate; aldehydes and ketones of benzyl, biacetyl and the like; 3-pyrazolidones and certain indane-1,3-diones; and chromanols (e.g., tocopherols). Of these compounds, particularly preferable reducing agents are bisphenols and chromanols.

In addition to the foregoing ingredients, it is sometimes advantageous to the present photothermographic material to contain an additive known as "toning agent" for enhancing the image quality. For instance, the material for toning agent may be prevent in a proportion of 0.1 to 10 weight % to the total silver-holding components. The toning agent is a known ingredient in the photography, as described in U.S. Pat. Nos. 3,080,254, 3,847,612 and 4,123,282.

Specific examples of a toning agent include phthalimide and N-hydroxyphthalimide; cyclic imides, such as succinimide, pyrazoline-5-one, quinazolinone, 3-phenyl-2-pyrazoline-5-one, 1-phenylurazole, quinazoline and 2,4-thiazolidinedione; naphthalimides (e.g., N-hydroxy-1,8-naphthalimide); cobalt complexes (e.g., cobalthexamine trifluoroacetate); mercaptanes, such an 3-mercapto-1,2,4-triazole, 2,4-dimercaptopyrimidine, 3-mercapto-4,5-diphenyl-1,2,4-triazole and 2,5-dimercapto-1,3,4-thiadiazole; N-(aminomethyl)aryldicarboxyides, ouch an (N,N-dimethylaminomethyl)phthalimide and N,N-(dimethylaminomethyl)-naphthalene-2,3-dicarboxyimide; blocked pyrazoles, isothiuronium derivatives and certain photodiscoloring agents (e.g., N,N-hexamethylenebis(1-carbamoyl-3,5-dimethylpyrazole), 1,8-(3,6-diazaoctane)bis (isothiuronium trifluoroacetate) and 2-(tribromomethylsulfonyl)benzothiazole; 3-ethyl-5[(3-ethyl-2-benzothiazolinidene)-1-methylethylidene]-2-thio-2, 4-oxazolidinedione; phthalazinone, and phthalazinone derivatives or metal salts, e.g., 4-(1-naphthyl)phthalazinone, 6-chlorophthalazinone, 5,7-dimethoxyphthalazinone and 2,3-dihydro-1,4-phthalazinedione; the combinations of phthalazinone with phthalic acid derivatives (such as phthalic acid, 4-methylphthalic acid, 4-nitrophtholic acid and tetrachlorophthalic anhydride); phthalazine, and phthalazine derivatives or metal salts, e.g., 4-(1-naphthyl) phthalazine, 6-chlorophthalazine, 5,7-dimethoxyphthalazine and 2,3-dihydroxyphthalazine; the combinations of phthalazine with phthalic acid derivatives (such as phthalic acid, 4-methylphthalic acid, 4-nitrophthalic acid and tetrachlorophthalic anhydride); quinazolinedione, benzoxazine or naphthoxazine derivatives; rhodium complexes functioning as not only tone adjuster but also halide ion source for formation of silver halide in situ, such as ammonium hexachlororhodate(III), rhodium bromide, rhodium nitrate and potassium hexachlororhodate(III); inorganic peroxides and persulfates, e.g., ammonium peroxydisulfide and hydrogen peroxide; benzoxazine-2,4-diones, such an 1,3-benzoxazine-2,4-dione, 8-methyl-1,3-benzoxazine-2,4-dione and 6-nitro-1,3-benzoxazine-2,4-dione; pyrimidines (e.g., 2,4-dihydroxypyrimidine, 2-hydroxy-4-aminopyrimidine); asymmetric triazines; azauracil; and tetraazapentalene derivatives (e.g., 3,6-dimercapto-1,4-diphenyl-1H,4H-2,3a,5,6a-tetraazapentalene and 1,4-di(o-chlorophenyl)-3,6-dimercapto-1H,4H-2,3a,5,6a-tetraazapentalene).

For the purpose of retarding or accelerating, that is, controlling the development, heightening the spectral sensitizing efficiency, enhancing the stability before and after the development and so on, a mercapto, disulfide or thione compound can be incorporated in the present photothormographic material.

The mercapto compound used in the present invention, though it may have any structure, in preferably a compound of represented by a formula Ar—SM or Ar—S—S—Ar, wherein M is a hydrogen atom or an alkali metal atom and Ar is an aromatic or condensed aromatic ring containing at least one nitrogen, sulfur, oxygen, selenium or tellurium atom. Such a heterocyclic aromatic ring in preferably a benzimidazole, naphthimidazole, naphthothiazole, benzoxazole, naphthoxazole, benzoselenazole, benzotellurazole, imidazole, oxazole, pyrazole, triaxole, thiadiazole, tetrazole, triazine, pyrimidine, pyridazine, pyrazine, pyridine, purine, quinoline or quinazolinone ring. These rings each may have one or more of a substituent selected from among a halogen atom (e.g., Br and Cl), a hydroxy group, an amino group, a carboxyl group, an alkyl group (e.g., an alkyl group containing at least one, preferably 1 to 4, carbon atoms) and an alkoxy group (e.g., an alkoxy group containing at least one, preferably 1 to 4, carbon atoms). Specific examples of a mercapto-substituted heterocyclic aromatic compound include 2-mercaptobenzimidazole, 2-mercaptobenzoxazole, 2-mercaptobenzothiazole, 2-mercapto-5-methylbenzimidazole, 6-ethoxy-2-mercaptobenzothiazole, 2,2'-dithiobis(benzothiazole), 3-mercapto-1,2,4-triazole, 4,5-diphenyl-2-imidazolethiole, 2-mercaptoimidazole, 1-ethyl-2-mercaptobenzimidazole, 2-mercaptoquinoline, 8-mercaptopurine, 2-mercapto-4(3H)-quinazolinone, 7-trifluoromethyl-4-quinolinethiole, 2,3,5,6-tetrachloro-4-pyridinethiole, 4-amino-6-hydroxy-2-morcaptopyrimidine monohydrate, 2-amino-5-mercapto-1,3,4-thiadiazole, 3-amino-5-marcapto-1,2,4-triazole, 4-hydroxy-2-mercaptopyrimidine, 2-mercaptopyrimidine, 4,6-diamino-2-mercaptopyrimidine, 2-mercapto-4-methylpyrimidine hydrochloride, 3-mercapto-5-phenyl-1,2,4-triazole and 2-mercapto-4-phenyloxazole, but these examples should not be construed as limiting the scope of the present invention.

It is desirable that the morcapto compound as recited above be incorporated in an emulsion layer in an amount of 0.001 to 1.0 mole, preferably 0.01 to 0.3 mole, per mole of silver.

The present photosensitive material can be provided with a surface protecting layer for the purpose of, e.g., preventing the adhesion of the image-forming layer. The surface protecting layer may be made from any adhesion preventing material. Suitable examples of an adhesion preventing material include wax, silica particles, a styrene-containing elastomeric copolymer (e.g., styrene-butadiene-styrene, or styrene-isobutylene-styrene), cellulose acetate, cellulose acetate butyrate, cellulose propionate, and mixtures of two or more thereof.

In the present emulsion layers and the protective layers therefor, the light-absorbing materials and the filter dyes as described in U.S. Pat. Nos. 3,253,921, 2,274,782, 2,527,583 and 2,956,879 can be used. The dyes incorporated can be mordanted as described, e.g., in U.S. Pat. No. 3,282,699. It in desirable for the filter dyes to be used in such an amount as to provide the absorbance of 0.1 to 3, preferably 0.2 to 1.5, at the wavelengths of exposure light.

The present emulsion layers and the protective layers therefor can contain a delustering agent, such as starch, titanium dioxide, zinc oxide, silica, and polymer beads including the beads described in U.S. Pat. Nos. 2,992,101 and 2,701,245. The matt degree on the emulsion side can be arbitrarily chosen so far as the star dust trouble does not occur, but it in desirably adjusted so that the Bekk smoothness ranges from 1,000 to 10,000 seconds, particularly from 2,000 to 10,000 seconds.

The binder for the present emulsion layers can be arbitrarily selected from well-known natural or synthetic resins, such as gelatin, polyvinyl acetal, polyvinyl chloride, polyvinyl acetate, cellulose acetate, polyolefin, polyester, polystyrene, polyacrylonitrile and polycarbonate. Of course, the binder may be selected from the copolymers and the terpolymers related to the above-recited ones. Specific examples of a polymer suitable for the binder include polyvinyl butyral, butyl ethyl cellulose, methacrylate copolymers, maleic anhydride copolymers, polystyrene and a butadiene-styrene copolymer. These polymers may be used as a mixture of two or more thereof, if needed. The polymers as recited above are used in an amount sufficient to hold ingredients therein. In other words, they are used in a range of amounts effective in functioning as binder. The effective amount range can be determined properly by persons skilled in the art. An for the measure in a case of holding at least an organic silver salt, it in desirable that the weight ratio of the binder to the organic silver halide be from 15:1 to 1:2, particularly from 8:1 to 1:1.

The present photothermographic material is preferably the so-called one-sided photosensitive material which has on one side of a support a photosensitive layer comprising at least one silver halide emulsion layer and on the other side a backing layer.

To the one-sided photosensitive material according to the present invention, a matting agent may be added for the purpose of making the travelling (conveying) properties better. In general, fine particles of water-insoluble organic or inorganic compounds are used as matting agent. Specifically, the matting agent used in the aforesaid photosensitive material may be any of the matting agents well known in the arts, including the organic matting agents described, e.g., in U.S. Pat. Nos. 1,939,213, 2,701,245, 2,322,037, 3,262,782, 3,539,344 and 3,767,448 and the inorganic matting agents described, e.g., in U.S. Pat. Nos. 1,260,772, 2,192,241, 3,257,206, 3,370,951, 3,523,022 and 3,769,020. More specifically, the organic compounds suitable for the matting agent include water-dispersable vinyl polymers, such an polymethylacrylate, polymethylmethacrylate, polyacrylonitrile, acrylonitrile-α-methylstyrene copolymer, polystyrene, styrene-divinylbenzene copolymer, polyvinyl acetate, polyethylene carbonate and polytetrafluoroethylene; cellulose derivatives, such as methyl cellulose, cellulose acetate and cellulose acetate propionate; starch derivatives, such an carboxystarch, carboxynitrophenyl starch and reaction products of urea, formaldehyde and starch; gelatins hardened with a known hardener; and gelatins hardened by coacervation to be formed into microencapsulated hollow particles. As for the inorganic compounds suitable for the matting agent, silicone dioxide, titanium dioxide, magnesium dioxide, aluminum oxide, barium sulfate, calcium carbonate, silver chloride and silver bromide desensitized by a known method, glass and diatomaceous earth axe examples thereof. The matting agents recited above can be used as a mixture of two or more compounds of different kinds, if needed. The matting agent has no particular limitation on its size and shape, so that it may have any particle size. In practice, however, the particle size ranging from 0.1 to 30 μm is advantageous to the matting agent used in the present invention. In addition, the particle size distribution of the matting agent used may be narrow or broad. On the other hand, the matting agent produces great influences on the haze and the surface gloss of a photosensitive material. Therefore, it is desirable that the particle size, the shape and the size distribution of the matting agent be adjusted so as to achieve the intended states of haze and surface gloss by properly choosing the production condition or mixing two or more matting compounds.

As for the matt degree of a backing layer in the present invention, it is desirable that the backing layer have Bekk smoothness of from 10 to 250 seconds, preferably from 50 to 180 seconds.

In the present photosensitive material, it is desirable that the matting agent be incorporated in the outermost layers, layers functioning as the outermost layers, layers close to the outer surfaces, or layers acting an the so-called protective layers.

The binder suitable for the backing layer of the present photosensitive material is a transparent or translucent, colorless (in general) film-forming material, such as a natural polymer and a synthetic resin including homo- and copolymer. Specific examples thereof include gelatin, gum arabic, polyvinyl alcohol, hydroxyethyl cellulose, cellulose acetate, cellulose acetate butyrate, polyvinyl pyrrolidone, casein, starch, polyacrylic acid, polymethylmethacrylic acid, polyvinyl chloride, polymethacrylic acid, styrene-maleic anhydride copolymer, styrene-acrylonitrile copolymer, styrene-butadiene copolymer, polyvinyl acetals (e.g., polyvinyl formal, polyvinyl butyral), polyesters, polyurethanes, phenoxy resin, polyvinylidene chloride, polyepoxides, polycarbonates, polyvinyl acetate, cellulose esters and polyamides. The binder may be used in the form of solution in water or an organic solvent, or in the form of emulsion.

In the present invention, it is desirable that the backing layer have the absorption maximum of from 0.3 to 2 in the wavelength region of 750 to 1,400 nm, preferably IR absorption of 0.5 to 2, and have absorption of from 0.001 to smaller than 0.5 in the visible region. Further, it is preferable that the backing layer be an antihalation layer having the optical density of from 0.001 to lower than 0.3.

The dyes used an antihalation dyes in the present invention may be any compounds so far as they have the intended absorption in the region of 750 to 1,400 nm, are sufficiently low in visible absorption and provide the foregoing absorbance spectral form desired for the backing layer. As examples of such dyes, mention may be made of the compounds described in JP-A-07-13295 and U.S. Pat. No. 5,380,635, and the compounds described in JP-A-02-68539 (from page 13, left lower column, line 1, to page 14, left lower column, line 9) and JP-A-03-24539 (from page 14, left lower column, to page 16, right lower column). However, these examples should not be construed as limiting on the scope of the present invention.

The backside resistive heating layers as described in U.S. Pat. Nos. 4,460,681 and 4,374,921 can also be applied to the light-senisitive photothermographic image formation system.

The silver halide emulsions or/and the organic silver salts in the present invention can be further protected from the additional fog formation by the use of an antifogging agent, a stabilizer or a precursor of stabilizers to effect the stabilization for the lowering of sensitivity upon storage. Suitable examples of an antifogging agent, a stabilizer and a precursaor of stabilizers which can be used alone or in combination include the thiazonium salts described in U.S. Pat. Nos. 2,131,038 and 2,694,716, the azaindenes described in U.S. Pat. Nos. 2,886,437 and 2,444,605, the mercury salts described in U.S. Pat. No. 2,728,663, the urazoles described in U.S. Pat. No. 3,287,135, the sulfocatechols described in U.S. Pat. No. 3,235,652, the oximes, the nitrones and the nitroindazoles described in British Patent 623,448, the polyvalent metal salts described in U.S. Pat. No. 2,839,405, the thiuronium salts described in U.S. Pat. No. 3,220,839, the palladium, platinum and gold salts described in U.S. Pat. Nos. 2,556,263 and 2,597,915, the halogen-substituted organic compounds described in U.S. Pat. Nos. 4,108,665 and 4,442,202, the triazines described in U.S. Pat. Nos. 4,128,557, 4,137,079, 4,138,365 and 4,459,350, and the phosphorus compounds described in U.S. Pat. No. 4,411,985.

For the photosensitive layers in the present invention, polyhydric alcohols (e.g., glycerines and diols of the types described in U.S. Pat. No. 2,960,404), the fatty acids or their esters described in U.S. Pat. Nos. 2,588,765 and 3,121,060 and the silicone resins described in British Patent 955,061 can be used as plasticizer or lubricant.

In each of the constituent layers of the present material, including photosensitive, protective and backing layers, hardeners may be used. Specific examples of such hardeners include the polyisocyanates described in U.S. Pat. No. 4,281,060 and JP-A-06-208193, the epoxy compounds described in U.S. Pat. No. 4,791,042, and the vinylsulfone compounds described in JP-A-62-89048.

For the purpose of improving coating properties and antistatic properties, surfactants may be used in the present invention. Any type of surfactant, including nonionic, anionic, cationic and fluorine-containing ones, can be used, if desired. As examples of a surfactant which can be properly used, mention may be made of the fluorine-containing high molecular surfactants described, e.g., in JP-A-62-170950 and U.S. Pat. No. 5,382,504, the fluorine-containing surfactants described, e.g., in JP-A-60-244945 and JP-A-63-188135, the polysiloxane surfactants described, e.g., in U.S. Pat. No. 3,885,965, and the polyalkylene oxides and the anionic surfactants described, e.g., in JP-A-06-301140.

In the present invention, hydrazine derivatives may be used. When the present invention uses a hydrazine derivative, the hydrazine derivative can be a compound represented by the formula (I) illustrated in Japanese Patent Application No. 6-47961 (corresponding to JP-A-7-287335). Specifically, the compounds exemplified as I-1 to I-53 in the reference cited above can be used.

Besides the above compounds, the following hydrazine derivatives can also be used to advantage: They include the compounds of formula (Ka-1) illustrated in JP-B-06-77138, specifically the compounds illustrated at pages 3–4 of the said gazette; the compounds of formula (I) illustrated in JP-B-06-93082, specifically Compounds 1 to 38 illustrated at pages 8–18 of the said gazette; the compounds of formula (4), (5) or (6) illustrated in JP-A-06-230497, specifically Compounds 4-1 to 4-10, Compounds 5-1 to 5-42 and Compounds 6-1 to 6-7 illustrated at pages 25–26, pages 28–36 and pages 39–40, respectively, of the said gazette; the compounds of formula (1) or (2) illustrated in JP-A-06-289520, specifically Compounds 1-1) to 1-17) and Compound 2-1) illustrated at pages 5–7 of the said gazette; the compounds of formula (Ka-2) or (Ka-3) illustrated in JP-A-06-313936, specifically the compounds illustrated at pages 6–19 of the said gazette; the compounds of formula (Ka-1) illustrated in JP-A-06-313951, specifically the compounds illustrated at pages 3–5 of the said gazette; the compounds of formula (I) illustrated in JP-A-07-5610, specifically Compounds I-1) to 1-38) illustrated at pages 5–10 of the said gazette; the compounds of formula (II) illustrated in JP-A-07-77783, specifically Compounds II-1) to II-102) illustrated at pages 10–27 of the said gazette; the compounds of formula (H) or (Ha) illustrated in JP-A-07-104426, specifically Compounds H-1 to H-44 illustrated at pages 8–15 of the said gazette; the compounds described in JP-A-9-22082 which are characterized by containing anionic groups in the vicinity of their respective hydrazino groups or nonionic groups forming intramolecular hydrogen bonding together with hydrogen atoms of their respective hydrazino groups, especially the compounds of formula (A), (B), (C), (D), (E) or (F) with specific examples including Compounds N-1 to N-30; and the compounds of formula (1) illustrated in JP-A-9-22082, specifically Compound D-1 to D-55 illustrated in the said gazette.

In using a nucleating agent of hydrazine type in the present invention, the nucleating agent may be dissolved in an appropriate water-miscible organic solvent, such an an alcohol (e.g., methanol, ethanol, propanol, a fluorinated alcohol), a ketone (e.g., acetone, methyl ethyl ketone), dimethylformamide, dimethyl sulfoxide or methyl cellosolve.

On the other hand, an emulsified dispersion of nucleating agent may be prepared using a well-known method, which comprises a step of dissolving the agent in an oil, such as dibutyl phthalate, tricresyl phosphate, glyceryl triacetate or diethyl phthalate, admixed with an auxiliary solvent such as ethyl acetate or cyclohexanone, if needed, and a step of mechanically emulsifying and dispersing the dissolved agent. Also, the powder of a hydrazine derivative may be dispersed into water with a ball mill, a colloid mill or ultrasonic waves according to the method known as solid dispersion method.

The nucleating agent of hydrazine type may be added to any of silver halide emulsion layers and other hydrophilic colloid layers arranged on the emulsion side of the support. In the present invention, however, it is desirable for the nucleating agent to be added to a silver halide emulsion layer or the hydrophilic colloidal layer adjacent thereto.

It in desirable in the present invention that the amount of the nucleating agent added be from 1 μmole to 10 mmole, preferably from 10 μmole to 5 mmole, particularly preferably from 20 μmole to 5 mmole, per mole of silver halide.

The addition of a mercury(II) salt as antifoggant to an emulsion layer, though not essential to the present invention, is sometimes favorable for the present invention.

The mercury(II) salts suitable for the above purpose are mercury acetate and mercury bromide. The proportion of the light-sensitive silver halide used in the present invention is generally from 0.75 to 25 mole %, preferably from 2 to 20 mole %, to the organic silver salt.

The photothermographic emulsions according to the present invention can be coated on a wide variety of supports. Typical examples of a usable support include a polyester film, a polyester film provided with a subbing layer, a polyethylene terephthalate film, a polyethylene naphthalate film, a cellulose nitrate film, a cellulose ester film, a polyvinyl acetal film, a polycarbonate film and resinous materials related thereto, and glass, paper and metal as well. Of these materials, flexible support materials, especially paper supports partially acetylated or coated with baryta and/or an α-olefin polymer, preferably the polymer of an α-olefin containing 2 to 10 carbon atoms, such as polyethylene, polypropylene or an ethylene-butene copolymer, are representative support materials. The support used in the present invention, though may be any of transparent and opaque ones, is preferably transparent.

The photosensitive material according to the present invention may have an antistatic or conductive layer, such as a layer containing a soluble salt (e.g., a chloride, a nitrate), an evaporated metal layer, or a layer containing the ionic polymer as described in U.S. Pat. Nos. 2,861,056 and 3,206,312 or the insoluble inorganic salt as described in U.S. Pat. No. 3,428,451.

In forming color images with a photothermographic material according to the present invention, the method described in JP-A-07-13295 (from page 10, left column, line 43, to page 11, left column, line 40) can be adopted. The stabilizers for color dye images formed therein are described in British Patent 1,326,889 and U.S. Pat. Nos. 3,432,300, 3,698,909, 3,574,627, 3,573,050, 3,764,337 and 4,042,394.

The photothermographic emulsions according to the present invention can be coated by any of various coating operations, including a dip coating operation, an air knife coating operation, a flow coating operation and an extrusion coating operation using the hopper described in U.S. Pat. No. 2,682,294. Two or more of those emulsions can be coated simultaneously using the method described in U.S. Pat. No. 2,761,791 or British Patent 837,095, if desired.

In the photothermographic material according to the present invention can be comprised additional layers, much as a dye-receiving layer for receiving transferred dye images, an opacified layer required in the case of reflection printing, a protective top coat layer and a primer layer know in the heat- and light-sensitive photography. In this case, it is desirable that the functional layers necessary for image formation, including an image-receiving layer, be integrated into the present photosensitive material to enable the photosensitive material to form images by itself.

The photosensitive materials according to the present invention, though they may be developed in any manner, are generally developed by raising the temperature thereof after imagewise exposure. The suitable temperature for development is from 80 to 250° C., preferably from 100 to 140° C. As for the development time, the range of 1 to 180 seconds is appropriate and that of 10 to 90 seconds is more appropriate.

The photosensitive materials according to the present invention can be exposed by any method. As the light source for exposure, however, it in desirable to use laser beams. The laser beams suitable for the present invention are beams generated by gas laser, YAG laser, dye laser, semiconductor laser or the like. Also, the combination of semiconductor laser with a second harmonic wave generating device can be used.

The present invention will now be illustrated in more detail by reference to the following examples, but theme examples should not be construed as limiting on the scope of the invention in any way.

EXAMPLE 1

Preparation of Silver Halide Grains:

A solution containing 22 g of phthaloylated gelatin and 30 mg of potassium bromide in 700 ml of water was adjusted to pH 5.0 at 35° C., and thereto 159 ml of a water solution containing 18.6 g of silver nitrate and a water solution containing potassium bromide and potassium iodide in a ratio of 92:8 by mole were added over a 10-minute period as the pAg was kept at 7.7 in accordance with the controlled double jet method. Thereto, 476 ml of a water solution containing 55.4 g of silver nitrate and a water solution containing 8.7 μmole/l of dipotassium hexachloroiridate and 1 mole/l of potassium bromide were further added over a 30-minute period an the pAg was kept at 7.7 in accordance with the controlled double jet method. Then, the pH of the resultant solution was lowered to cause flocculation, thereby effecting a desalting treatment. The thus desalted matter was admixed with 0.10 g of phenoxyethanol, and adjusted to pH 6.0 and pAg 8.2 to prepare silver iodobromide grains (cubic grains having the iodide content of 2 mole % on the average and 8 mole % in the core part, the average size of 0.05 μm, the projected area variation coefficient of 8%, and the (100) plane proportion of 87%).

The silver halide grains thus obtained were heated up to 60° C., and thereto were added 85 μmole/mole silver of sodium thiosulfate, 12 μmole/mole silver of 2,3,4,5,6-pentafluorophenyldiphenylphosphine selenide, 15 μmole/mole silver of tellurium Compound 1, 2.1 μmole/mole silver of chloroauric acid and 250 μmole/mole silver of thiocyanic acid. The resultant mixture was ripened for 150 minutes, and then quenched repidly to 30° C., thereby preparing a silver halide emulsion.

Preparation of Organic Acid-Silver Salt Emulsion:

Stearic acid, arachidic acid and behenic acid in amounts of 1.3 g, 0.5 g and 8.5 g, respectively, and 300 ml of distilled water were mixed for 15 minutes at 90° C., and thereto 31.1 ml of an aqueous 1N-NaOH solution was added over a 15-minute period with vigorous stirring. Then, the admixture was cooled to 30° C., and thereto 7 ml of an aqueous 1N-$H_3PO_4$ solution was added. Further thereto, 9 mg of N-bromosuccinimide was added with more vigorous stirring. The resultant mixture was admixed with the previously prepared silver halide grains in an amount of 2.5 mmole. Thereto, 25 ml of an aqueous 1N-$AgNO_3$ solution was added over a 2-minute period, and the stirring was continued for 90 minutes. Thereafter, the solid matter was filtered with suction, and washed. This operation was repeated till the conductivity of the filtrate became 30 μS·cm. The thus obtained solid matter was admixed with 37 g of a 1.2 weight % butyl acetate solution of polyvinyl acetate, and stirred. After finish the stirring, the admixture was allowed to stand, and thereby it was separated into an oil layer and a water layer. The water layer was removed together with the malts contained therein to isolate the oil layer. To the thus obtained oil layer, 20 g of a 2.5 weight % 2-butanone solution of polyvinyl butyral (Denka Butyral #3000-K, commercial name, a product of Electro Chemical Industry Co., Ltd.) was added with stirring. Further thereto, 0.1 mmole of pyridinium bromide perbromide and 0.1 mmole potassium bromide dihydrate were added together with 0.7 g methanol. Furthermore thereto, 40 g of 2-butanone and 7.8 g of polyvinyl butyral (PBV B-76, commercial name, a product of Monsanto Co.) were added, and subjected to a dispersing operation with a homogenizer. Thus, an organic acid-silver salt emulsion (needle-form grains having the average breadth of 0.04 μm, the average length of 1 μm and the variation coefficient of 27%) was obtained.

Preparation of Coating Composition for Emulsion Layer:

To the organic acid-silver salt emulsion obtained above, the ingredients described below were added in the following amounts, respectively, per mole of silver to prepare a coating composition A for an emulsion layer. Specifically, 10 mg of sodium phenylthiosulfonate, 70 mg of a dye D-1, 2 g of 2-mercapto-5-methylbenzimidazole, 21 g of 4-chlorobenzophenone-2-carboxylic acid, 580 g of 2-butanone and 220 g of dimethylformamide were admixed at 25° C. with stirring. The resulting admixture was allowed to stand for 3 hours. Thereto, 8 g of 5-tribromomethylsulfonyl-2-methylthiadiazole, 6 g of 2-tribromomethylsulfonylbenzothiazole, 4.5 g of 4,6-ditrichloromethyl-2-phenyltriazine, 2 g of disulfide compound 1, 155 g of 1,1-bis(2-hydroxy-3,5-dimethylphenyl)-3,5,5-trimethylhexane, 5 g of tetrachlorophthalic acid, 1 g of a fluorine-containing surfactant (Megafac F-176P, commercial name, a product of Dai-Nippon Ink & Chemicals, Inc.), 590 g of 2-butanone and 10 g of methyl isobutyl ketone were added with stirring.

Other coating Compositions B to E were prepared in the same manner as described above, except that a dye D-6, a dye D-10, and comparative dyes 1 and 2 in amounts equimolar with the dye D-1 were used respectively in place of the dye D-1.

Preparation of Coating Composition for Protective Layer on Emulsion Side:

In a mixture of 3,070 g of 2-butanone with 30 g of ethyl acetate were dissolved 75 g of cellulose acetate butyrate (CAB171-15S, commercial name, a product of Eastman Chemical Co., Ltd.), 5.7 g of 4-methylphthalic acid, 1.5 g of tetrachlorophthalic anhydride, 12 g of phthalazine, 0.3 g of Megafac F-176P, 1.8 g of very spherical silica having the average size of 3 μm (Silidex H31, commercial name, a product of Dokai Chemical Co., Ltd.) and 6 g of polyisocyanate (Sumidur N3500, commercial name, a product of Sumitomo Bayer Urethane Co., Ltd.), thereby preparing a coating composition.

Composition to be Coated on Back Side:

A calcium compound (Calcium Compound 1) was produced in the following manner: To 1 l of an ethanol solution containing 0.08 mole of 3,5-di-tert-butylcatechol were added 167 ml of a water solution containing 0.019 mole of calcium chloride and 125 ml of 25% aqueous ammonia. Thereinto, air was bubbled for 3 hours at room temperature to precipitate the crystals of bis[2-(3,5-di-tert-butyl-o-benzoquinone monoimide)-4,6-di-tert-butylphenolato]calcium(II).

To a mixture of 500 g of 2-butanone with 500 g of 2-propanol, 12 g of polyvinyl butyral (Denka Butyral #4000-2, commercial name, a product of Electro Chemical Industry Co., Ltd.), 12 g of cellulose acetate butyrate (CAB381-20, commercial name, a product of Eastman Chemical Co., Ltd.), 120 mg of Dye 1, 300 mg of Calcium Compound 1, 350 mg of Dye 2, 5 mg of Dye 3, 0.4 g of very spherical silica having the average size of 12 μm (Silidex H121, commercial name, a product of Dokai Chemical Co., Ltd.), 0.4 g of very spherical silica having the average size of 5 μm (Silidex H51, commercial name, a product of Dokai Chemical Co., Ltd.), 0.1 g of Megafac F-176P and 2 g of Sumidur N3500 were added with stirring to mix them homogeneously. Thus, a back-side coating composition was prepared.

Preparation of Photosensitive Material:

Each of the Coating Compositions A to E prepared above for emulsion layers was coated on a 175 μm-thick, blue dye-tinged polyethylene terephthalate support at a silver coverage of 2.3 g/m$^2$, and then the back-side coating composition prepared above was coated on the side opposite the emulsion layer so that the coating had an optical density of 0.7 at 810 nm. Further, the foregoing coating composition for protective layer was coated on the emulsion layer so that the protective layer formed had a dry thickness of 2 μm. The thus obtained photosensitive materials A to E each had a smoothness of 1000 seconds on the emulsion side and a smoothness of 80 seconds on the back side (wherein the smoothness values were determined as Bekk smoothness by the Ohken-type smoothness measurement described in J. TAPPI paper and pulp testing method No. 5).

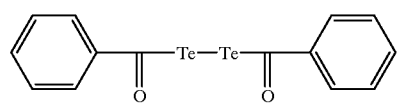
Tellurium Compound 1
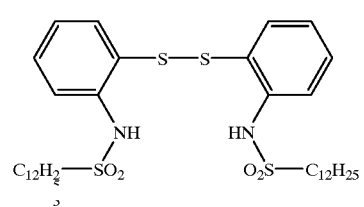
Disulfide Compound 1
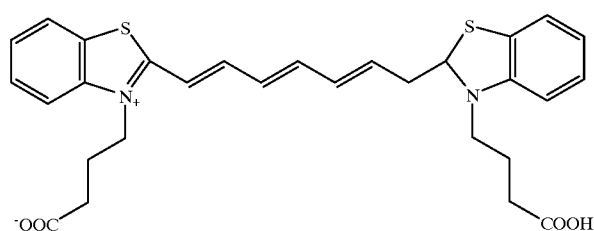
Comparative Dye 1
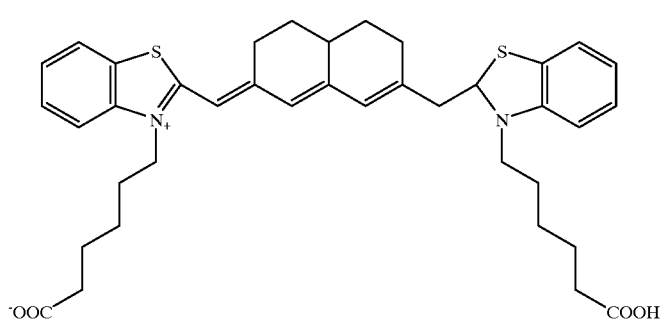
Comparative Dye 2
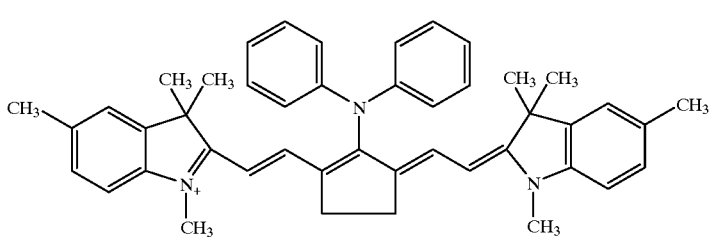
Dye 1
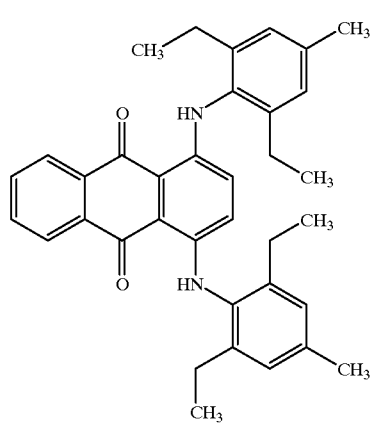
Blue Dye -continued

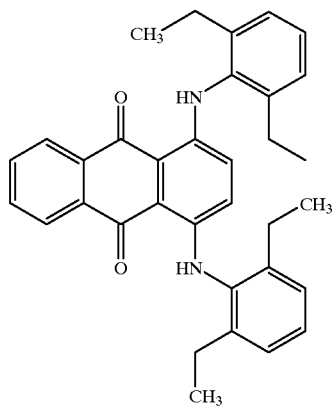

Dye 2

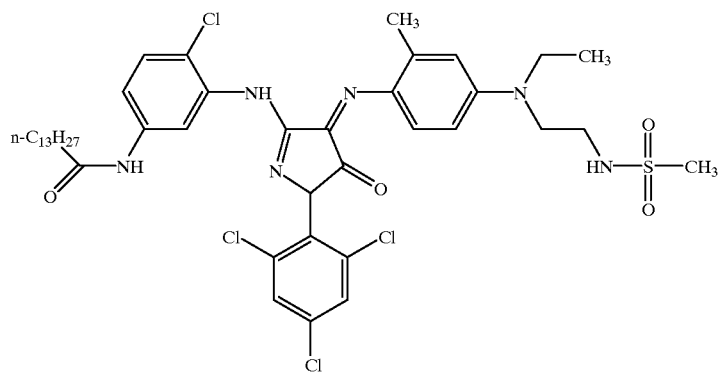

Dye 3

Evaluation of Photographic Properties:

The photosensitive materials A to E were each exposed by means of a laser sensitometer equipped with a 810 nm diode, and processed (developed) at 120° C. for 15 seconds. The thus obtained images were each evaluated by the measurement with a densitometer. Therein, the values of Dmin and sensitivity (the reciprocal of an ratio of an exposure amount providing the density higher than Dmin by 1.0) were determined. Additionally, the sensitivities shown in Table 1 are relative values, with the photosensitive material A being taken as 100.

Evaluation of Aging Characteristcs Upon Storage:

Each of the photosensitive materials A to E was allowed to stand for one day under the condition of 25° C.-50% RH. Ten sheets of each photosensitive material were sealed in a bag made of a moistureproofing material and further packed in a veneered case having the volume of 35.1 cm×26.9 cm×3.0 cm, and stored for 5 days at 50° C. Thus, forcibly aged samples were prepared. In addition, a reference standard of each sample was prepared as follows: Other ten sheets of each photosensitive material were subjected to the same treatment as described above, except that the storage temperature was changed to 4° C. The thus prepared forcibly aged samples and reference samples were each subjected to the same proceseing operations as in the evaluation of the photographic properties, and examined for fog density. The natural aging characteristics were evaluated by an increase rate in fog.

The increase rate in fog is defined by the following equation:

Increase rate in fog=[[(fog density of forcibly aged sample)–(fog density of reference sample)]/[(maximum density of reference sample)–(support density)]]×100

Accordingly, the lower the increase rate in fog, the better the natural aging characteristics.

Evaluation of Image Storage Characteristics Under Exposure to Light:

Each photosensitive material which had been exposed and developed under the same conditions as in the evaluation of photographic properties was fixed on the inside of a glass window exposed direct to the sun, and allowed to stand for 1 month. Then, the image appearance was evaluated by visual observation according to the following criterion:

⊚ . . . practically no change.

○ . . . slight change in tone but negligible.

Δ . . . color change in the image area but practically allowable.

x . . . color change and density increase in the Dmin area, and so improper.

Evaluation of Image Storage Characteristics Under Exposure to Heat in the Dark:

Each photosensitive material which had been exposed and developed under the same conditions as in the evaluation of photographic properties was allowed to stand for 1 month at 40° C. under a light-shielded condition. Then, the image appearance was evaluated by visual observation according to the following criterion:

⊚ . . . practically no change.

○ . . . slight change in tone but negligible.

Δ . . . color change in the image area but practically allowable.

x . . . color change and density increase in the Dmin area, and so improper.

The results of the aforementioned characteristics evaluations are shown in Table 1. As can be seen from Table 1, high sensitivity, low Dmin, excellent aging characteristics and excellent image storage characteristics were achieved only within the scope of the present invention.

TABLE 1

| Sample Name | Sensitivity | Dmin | Aging characteristics upon storage | Image Storage Characteristics under exposure to light | under exposure to heat in the dark | Note |
| --- | --- | --- | --- | --- | --- | --- |
| A | 100 | 0.19 | 2 | ○ | ○ | invention |
| B | 120 | 0.19 | 1 | ○ | ○ | invention |
| C | 110 | 0.18 | 1 | ○ | ○ | invention |
| D | 30 | 0.22 | 15 | ⊚ | Δ | comparison |
| E | 70 | 0.24 | 70 | x | x | comparison |

EXAMPLE 2

Preparation of Organic Acid-Silver Salt Emulsion:

To 12 liter of water were added 840 g of behenic acid and 95 g of stearic acid. Thereto, a solution containing 48 g of sodium hydroxide and 64 g of sodium carbonate in 1.5 liter of water was added and stirred for 30 minutes under the temperature kept at 90° C. After cooling to 50° C., the resultant solution was admixed with 1.1 liter of a 1% water solution of N-bromosuccinimide. Thereto, 2.3 liter of a 17% water solution of silver nitrate was added little by little with stirring. Further, the solution temperature was lowered to 35° C., and 1.5 liter of a 2% water solution of potassium bromide was added over a 2-minute period with stirring. The resultant mixture was stirred for 30 minutes, and then admixed with 2.4 liter of a 1% water solution of N-bromosuccinimlde. To this aqueous mixture, 3,300 g of a 1.2 weight % butyl acetate solution of polyvinyl acetate was added with stirring, and allowed to stand for 10 minutes to result in separation into two layers. The water layer thus separated was removed, and the gel remaining was washed twice with water. The thus obtained mixture of silver behenate/stearate gel with silver bromide was dispersed into 1,800 g of a 2.6% isopropanol solution of polyvinyl butyral (Donka Butyral #3000-K, commercial name, a product of Electro Chemical Industry Co., Ltd.), and further dispersed with a mixture of 600 g of polyvinyl butyral (Denka Butyral #4000-2, commercial name, a product of Electro Chemical Industry Co., Ltd.) and 300 g of isopropanol. Thus, an organic acid-silver salt emulsion (needle-form grains having the average breadth of 0.05 μm, the average length of 1.2 μm and the variation coefficient of 26%) was obtained.

Preparation of Coating Composition for Emulsion Layer:

To the organic acid-silver salt emulsion obtained above, the ingredients described below were added in the following amounts, respectively, per mole of silver to prepare a coating Composition X for an emulsion layer. Specifically, 10 mg of sodium phenylthiosulfonate, 70 mg of a dye D-4, 2.3 g of 2-mercapto-5-methylbenzimidazole, 21.5 g of 4-chlorobenzophenone-2-carboxylic acid, 580 g of 2-butanone and 220 g of dimethylformamide were admixed at 25° C. with stirring. The resulting admixture was allowed to stand for 3 hours. Thereto, 8 g of 5-tribromomethylsulfonyl-2-methylthiadiazole, 6 g of 2-tribromomethylsulfonylbenzothiazole, 5.1 g of 4,6-ditrichloromethyl-2-phenyltriazine, 2 g of disulfide compound 1, 161 g of 1,1-bis(2-hydroxy-3,5-dimethylphenyl)-3,5,5-trimethylhexane, 5 g of tetrachlorophthalic acid, 2.6 g of Hydrazine Derivative a, 1.1 g of a fluorine-containing surfactant (Megafac F-176P, commercial name, a product of Dai-Nippon Ink & Chemicals, Inc.), 590 g of 2-butanone and 10 g of methyl isobutyl ketone were added with stirring.

Other coating Compositions Y and Z were prepared in the same manner as described above, except that a dye D-12 and Comparative Dye 1 in amounts equimolar with the dye D-4 were used respectively in place of the dye D-4.

Preparation of Coating Composition for Protective Layer on Emulsion Side:

In a mixture of 3,070 g of 2-butanone with 30 g of ethyl acetate were dissolved 75 g of cellulose acetate butyrate (CAB3171-15S, commercial name, a product of Eastman Chemical Co., Ltd.), 5.7 g of 4-methylphthalic acid, 1.8 g of tetrachlorophthalic anhydride, 13 g of phthalazine, 0.3 g of Megafac F-176P, 2 g of very spherical silica having the average size of 3 μm (Silidex H31, commercial name, a product of Dokai Chemical Co., Ltd.) and 7 g of polyisocyanate (Sumidur N3500, commercial name, a product of Sumitomo Bayer Urethane Co., Ltd.), thereby preparing a coating composition.

Preparation of Support having Backing Layer:

A 100 μm-thick polyethylene terephthalate film provided on both sides with a moistureproofing undercoat comprising polyvinylidene chloride (support) was covered with the same backing layer as in Example 1.

On the side opposite to the backing layer, the support was coated with each of the Coating Compositions X to Z prepared above for emulsion layer so an to have a silver coverage of 2 g/m², and further with the foregoing coating composition for protective layer on the emulsion side so that the protective layer formed had a dry thickness of 2 μm. Thus, photosensitive materials X to Z were obtained.

Hydrazine Derivative a

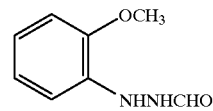

Evaluation of Photographic Properties of Hard Photosensitive Material:

The photosensitive materials X to Z were each exposed by means of a laser sensitometer equipped with a 820 nm diode, and processed (developed) at 115° C. for 25 seconds. The thus obtained images were each evaluated by the measurement with a densitometer. Therein, the values of Dmin and sensitivity (the reciprocal of a ratio of an exposure amount providing the density higher than Dmin by 3.0) were determined. Additionally, the sensitivities shown in Table 2 are relative values, with the photosensitive material X being taken as 100. Further, each photosensitive material was examined for gradient γ, which was defined as the slope of a straight line connecting the points on the characteristic curve corresponding to the densities 0.3 and 3.0, respectively.

TABLE 2

| Sample Name | Sensitivity | Dmin | γ | note |
| --- | --- | --- | --- | --- |
| X | 100 | 0.16 | 12 | invention |
| Y | 120 | 0.18 | 11 | invention |
| Z | 40 | 0.23 | 3 | comparison |

As can be seen from Table 2, high sensitivity, low Dmin and high contrast were attained only within the scope of the present invention.

EXAMPLE 3

Preparation of Silver Halide Grains:

A solution containing 22 g of phthaloylated gelatin and 30 mg of potassium bromide in 700 ml of water was adjusted to pH 5.0 at 35° C., and thereto 159 ml of a water solution containing 18.6 g of silver nitrate and a water solution containing potassium bromide and potassium iodide in a ratio of 92:8 by mole were added over a 10-minute period as the pAg was kept at 7.7 in accordance with the controlled double jet method. Thereto, 476 ml of a water solution containing 55.4 g of silver nitrate and a water solution containing 9 μmole/l of dipotasasium hexachloroiridate and 1 mole/l of potassium bromide were further added over a 30-minute period an the pAg was kept at 7.7 in accordance with the controlled double jet method. Then, the pH of the resultant solution was lowered to cause flocculation, thereby effecting a desalting treatment. The thus desalted matter was admixed with 0.10 g of phenoxyethanol, and adjusted to pH 5.9 and pAg 8.2 to prepare silver iodobromide grains (cubic grains having the iodide content of 2 mole % on the average and 8 mole % in the core part, the average size of 0.05 μm, the projected area variation coefficient of 8%, and the (100) plane proportion of 87%).

The silver halide grains thus obtained were heated up to 60° C., and thereto were added 85 μmole/mole silver of sodium thiosulfate, 11 μmole/mole silver of 2,3,4,5,6-pentafluorophenyldiphenylphosphine selenide, 15 μmole/mole silver of tellurium Compound 1 (the same compound as used in Example 1), 2 μmole/mole silver of chloroauric acid and 200 μmole/mole silver of thiocyanic acid silver. The resultant mixture was ripened for 150 minutes, and then quenched rapidly to 30° C., thereby preparing a silver halide emulsion.

Preparation of Organic Acid-Silver Salt Emulsion:

Stearic acid, arachidic acid and behenic acid in amounts of 1.3 g, 0.5 g and 8.5 g, respectively, and 300 ml of distilled water were mixed for 15 minutes at 90° C., and thereto 31.1 ml of an aqueous 1N-NaOH solution was added over a 15-minute period with vigorous stirring. Then, the admixture was cooled to 30° C., and thereto 7 ml of an aqueous 1N-$H_3PO_4$ solution was added. Further thereto, 9 mg of N-bromosuccinimide was added with more vigorous stirring. The resultant mixture was admixed with the previously prepared silver halide grains in an amount of 2.5 mmole. Thereto, 25 ml of an aqueous 1N-$AgNO_3$ solution was added over a 2-minute period, and the stirring was continued for 90 minutes. Thereafter, the solid matter was filtered with suction, and washed. This operation was repeated till the conductivity of the filtrate became 30 μS·cm. The thus obtained solid matter was admixed with 37 g of a 1.2 weight % butyl acetate solution of polyvinyl acetate, and stirred. After finish the stirring, the admixture was allowed to stand, and thereby it was separated into an oil layer and a water layer. The water layer was removed together with the malts contained therein to isolate the oil layer. To the thus obtained oil layer, 20 g of a 2.5 weight % 2-butanone solution of polyvinyl butyral (Denka Butyral #3000-K, commercial name, a product of Electro Chemical Industry Co., Ltd.) was added with stirring. Further thereto, 0.1 mmole of bromopyridinium perbromide and 0.1 mmole potassium bromide dihydrate were added together with 0.7 g methanol. Furthermore thereto, 40 g of 2-butanone and 7.8 g of polyvinyl butyral (PBV B-76, commercial name, a product of Monsanto Co.) were added, and subjected to a dispersing operation with a homogenizer. Thus, an organic acid-silver salt emulsion (needle-form grains having the average breadth of 0.04 μm, the average length of 1 μm and the variation coefficient of 29%) was obtained.

Preparation of Coating Composition for Emulsion Layer:

To the organic acid-silver salt emulsion obtained above, the ingredients described below were added in the following amounts, respectively, per mole of silver to prepare a coating Composition A' for an emulsion layer. Specifically, 10 mg of sodium phenylthiosulfonate, 70 mg of a dye D-1', 2 g of 2-mercapto-5-methylbenzimidazole, 21.5 g of 4-chlorobenzophenone-2-carboxylic acid, 580 g of 2-butanone and 220 g of dimethylformamide were admixed at 25° C. with stirring. The resulting admixture was allowed to stand for 3 hours. Thereto, 6 g of 5-tribromomethylsulfonyl-2-methylthiadiazole, 6 g of 2-tribromomethylsulfonylbenzothiazole, 5 g of 4,6-ditrichloromethyl-2-phenyltriazine, 2 g of disulfide compound 1 (the same compound as used in Example 1), 155 g of 1,1-bis(2-hydroxy-3,5-dimethylphenyl)-3,5,5-trimethylhexane, 5 g of tetrachlorophthalic acid, 1.1 g of a fluorine-containing surfactant (Megafac F-176P, commercial name, a product of Dai-Nippon Ink & Chemicals, Inc.), 590 g of 2-butanone and 10 g of methyl isobutyl ketone were added with stirring.

Other coating Compositions B' to E' were prepared in the same manner as described above, except that a dye D-6', a dye D-11', and comparative dyes 1 and 2 (the same dyes as used in Example 1) in amounts equimolar with the dye D-1' were used respectively in place of the dye D-1'.

Preparation of Coating Composition for Protective Layer on Emulsion Side:

In a mixture of 3,070 g of 2-butanone with 30 g of ethyl acetate were dissolved 75 g of cellulose acetate butyrate (CAB171-15S, commercial name, a product of Eastman Chemical Co., Ltd.), 5.7 g of 4-methylphthalic acid, 1.5 g of tetrachlorophthalic anhydride, 12 g of phthalazine, 0.3 g of Megafac F-176P, 2 g of very spherical silica having the average size of 3 μm (Silidex H31, commercial name, a product of Dokai Chemical Co., Ltd.) and 6 g of polyisocyanate (Sumidur N3500, commercial name, a product of Sumitomo Bayer Urethane Co., Ltd.), thereby preparing a coating composition.

Composition to be Coated on Back Side:

A calcium compound (Calcium Compound 1) was produced in the following manner: To 1 l of an ethanol solution containing 0.08 mole of 3,5-di-tert-butylcatechol were added 167 ml of a water solution containing 0.019 mole of calcium chloride and 125 ml of 25% aqueous ammonia.

Thereinto, air was bubbled for 3 hours at room temperature to precipitate the crystals of bis[2-(3,5-di-tert-butyl-o-benzoquinone monoimide)-4,6-di-tert-butylphenolato]calcium(II).

To a mixture of 500 g of 2-butanone with 500 g of 2-propanol, 12 g of polyvinyl butyral (Denka Butyral #4000-2, commercial name, a product of Electro Chemical Industry Co., Ltd.), 12 g of cellulose acetate butyrate (CAB381-20, commercial name, a product of Eastman Chemical Co., Ltd.), 120 mg of Dye 1 (the same one as used in Example 1), 300 mg of Calcium Compound 1, 350 mg of Dye 2 (the same one as used in Example 1), 5 mg of Dye 3 (the same one as used in Example 1), 0.4 g of very spherical silica having the average size of 12 $\mu$m (Silidex H121, commercial name, a product of Dokai Chemical Co., Ztd.), 0.4 g of very spherical silica having the average size of 5 $\mu$m (Silidex H51, commercial name, a product of Dokai Chemical Co., Ltd.), 0.1 g of Magafax F-176P and 2 g of Sumidur N3500 were added with stirring to mix them homogeneously. Thus, a back-side coating composition was prepared.

Preparation of Photosensitive Material:

Each of the Coating Compositions A' to E' prepared above for emulsion layers was coated on a 175 $\mu$m-thick, blue dye-tinged polyethylene terephthalate support at a silver coverage of 2.3 g/m$^2$, and then the back-side coating composition prepared above was coated on the side opposite the emulsion layer so that the coating had an optical density of 0.7 at 810 nm. Further, the foregoing coating composition for protective layer was coated on the emulsion layer so that the protective layer formed had a dry thickness of 2 $\mu$m. The thus obtained photosensitive materials A' to E' each had a smoothness of 1,000 seconds on the emulsion side and a smoothness of 80 seconds on the back side (wherein the smoothness values were determined as Bekk smoothness by the Ohken-type smoothness measurement described in J. TAPPI paper and pulp testing method No. 5).

Evaluation of Photographic Properties:

The photosensitive materials A' to E' were each exposed by means of a laser sensitometer equipped with a 810 nm diode, and processed (developed) at 120° C. for 15 seconds. The thus obtained images were each evaluated by the measurement with a densitometer. Therein, the values of Dmin and sensitivity (the reciprocal of a ratio of an exposure amount providing the density higher than Dmin by 1.0) were determined. Additionally, the sensitivities shown in Table 3 are relative values, with the photosensitive material A' being taken as 100.

Evaluation of Aging Characteristic Upon Storage:

Each of the photosensitive materials A' to E' was allowed to stand for one day under the condition of 25° C.-50% RH. Ten sheets of each photosensitive material were sealed in a bag made of a moistureproofing material and further packed in a veneered case having the volume of 35.1 cm×26.9 cm×3.0 cm, and stored for 5 days at 50° C. Thus, forcibly aged samples were prepared. In addition, a reference standard of each sample wua prepared as follows: Other ten sheets of each photosensitive material were subjected to the same treatment as described above, except that the storage temperature was changed to 4° C. The thus prepared forcibly aged samples and reference samples were each subjected to the same processing operations an in the evaluation of the photographic properties, and examined for fog density. The natural aging characteristics were evaluated by an increase rate in fog.

The increase rate in fog is defined by the following equation:

Increase rate in fog=[[(fog density of forcibly aged sample)−(fog density of reference sample)]/[(maximum density of reference sample)−(support density)]]×100

Accordingly, the lower the increase rate in fog, the better the natural aging characteristics.

Evaluation of Image Storage Characteristics Under Exposure to Light:

Each photosensitive material which had been exposed and developed under the same conditions as in the evaluation of photographic properties was fixed on the inside of a glass window exposed direct to the sun, and allowed to stand for 1 month. Then, the image appearance was evaluated by visual observation according to the following criterion:

⊙ . . . practically no change.

○ . . . slight change in tone but negligible.

Δ . . . color change in the image area but practically allowable.

x . . . color change and density increase in the Dmin area, and so improper.

Evaluation of Image Storage Characteristics Under Exposure to Heat in the Dark:

Each photosensitive material which had been exposed and developed under the same conditions as in the evaluation of photographic properties was allowed to stand for 1 month at 40° C. under a light-shielded condition. Then, the image appearance was evaluated by visual observation according to the following criterion:

⊙ . . . practically no change.

○ . . . slight change in tone but negligible.

Δ . . . color change in the image area but practically allowable.

x . . . color change and density increase in the Dmin area, and so improper.

The results of the aforementioned characteristics evaluations are shown in Table 3. As can be seen from Table 3, high sensitivity, low Dmin, excellent aging characteristics and excellent image storage characteristics were achieved only within the scope of the present invention.

TABLE 3

| Sample Name | Sensitivity | Dmin | Aging characteristics upon storage | Image Storage Characteristics under exposure to light | under exposure to heat in the dark | Note |
|---|---|---|---|---|---|---|
| A' | 100 | 0.19 | 1 | ⊙ | ⊙ | invention |
| B' | 105 | 0.20 | 2 | ⊙ | ⊙ | invention |
| C' | 110 | 0.20 | 2 | ⊙ | ⊙ | invention |
| D' | 20 | 0.20 | 20 | ○ | Δ | comparison |
| E' | 80 | 0.25 | 90 | x | x | comparison |

EXAMPLE 4

Preparation of Organic Acid-Silver Salt Emulsion:

To 12 liter of water were added 840 g of behenic acid and 95 g of stearic acid. Thereto, a solution containing 48 g of sodium hydroxide and 63 g of sodium carbonate in 1.5 liter of water was added and stirred for 30 minutes under the temperature kept at 90° C. After cooling to 50° C., the resultant solution was admixed with 1.1 liter of a 1% water solution of N-bromosuccinimide. Thereto, 2.3 liter of a 17% water solution of silver nitrate was added little by little with stirring. Further, the solution temperature was lowered to 35° C., and 1.5 liter of a 2% water solution of potassium bromide was added over a 2-minute period with stirring. The resultant mixture was stirred for 30 minutes, and then admixed with 2.4 liter of a 1% water solution of N-bromosuccinimide. To this aqueous mixture, 3,300 g of a 1.2 weight % butyl acetate solution of polyvinyl acetate was added with stirring, and allowed to stand for 10 minutes to result in separation into two layers. The water layer thus separated was removed, and the gel remaining was washed twice with water. The thus obtained mixture of silver behenate/stearate gel with silver bromide was dispersed into 1,800 g of a 2.6% isopropanol solution of polyvinyl butyral (Denka Butyral #3000-K, commercial name, a product of Electro Chemical Industry Co., Ltd.), and further dispersed with a mixture of 600 g of polyvinyl butyral (Denka Butyral #4000-2, commercial name, a product of Electro Chemical Industry Co., Ltd.) and 300 g of isopropanol. Thus, an organic acid-silver salt emulsion (needle-form grains having the average breadth of 0.05 $\mu$m, the average length of 1.2 $\mu$m and the variation coefficient of 25%) was obtained.

Preparation of Coating Composition for Emulsion Layer:

To the organic acid-silver salt emulsion obtained above, the ingredients described below were added in the following amounts, respectively, per mole of silver to prepare A coating Composition X' for an emulsion layer. Specifically, 10 mg of sodium phenylthiosulfonate, 70 mg of a dye D-2', 2 g of 2-mercapto-5-methylbenzimidazole, 21.5 g of 4-chlorobenzophenone-2-carboxylic acid, 580 g of 2-butanone and 220 g of dimethylformamide were admixed at 25° C. with stirring. The resulting admixture was allowed to stand for 3 hours. Thereto, 8 g of 5-tribromoethylsulfonyl-2-methylthiadiazole, 6 g of 2-tribromomethylsulfonylbenzothiazole, 5.1 g of 4,6-ditrichloromethyl-2-phenyltriazine, 2 g of disulfide compound 1 (the same compound as used in Example 2), 160 g of 1,1-bis(2-hydroxy-3,5-dimethylphenyl)-3,5,5-trimethylhexane, 5 g of tetrachlorophthalic acid, 2.3 g of Hydrazine Derivative a (the same one as used in Example 2), 1.1 g of a fluorine-containing surfactant (Megafac F-176P, commercial name, a product of Dai-Nippon Ink & Chemicals, Inc.), 590 g of 2-butanone and 10 g of methyl isobutyl ketone were added with stirring.

Other coating Compositions Y' and Z' were prepared in the same manner as described above, except that a dye D-15' and Comparative Dye 1 in amounts equimolar with the dye D-2' were used respectively In place of the dye D-2'.

Preparation of Coating Composition for Protective Layer on Emulsion Side:

In a mixture of 3,070 g of 2-butanone with 30 g of ethyl acetate were dissolved 75 g of cellulose acetate butyrate (CAB171-15S, commercial name, a product of Eastman Chemical Co., Ltd.), 5.7 g of 4-methylphthalic acid, 1.5 g of tetrachlorophthalic anhydride, 13 g of phthalazine, 0.3 g of Megafac F-176P, 2 g of very spherical silica having the average size of 3 $\mu$m (Silidex H31, commercial name, a product of Dokai Chemical Co., Ltd.) and 7 g of polyisocyanate (Sumidur N3500, commercial name, a product of Sumitomo Bayer Urethane Co., Ltd.), thereby preparing a coating composition.

Preparation of Support having Backing Layer:

A 100 $\mu$m-thick polyethylene terephthalate film provided on both sides with a moistureproofing undercoat comprising polyvinylidene chloride (support) was covered with the same backing layer as in Example 3.

On the side opposite to the backing layer, the support was coated with each of the Coating Compositions X' to Z' prepared above for emulsion layer so as to have a silver coverage of 2 g/m$^2$, and further with the foregoing coating composition for protective layer on the emulsion side so that the protective layer formed had a dry thickness of 2 $\mu$m. Thus, photosensitive materials X' to Z' were prepared.

Evaluation of Photogapahic Properties of Hard Photosensitive Material:

The photosensitive materials X' to Z' were each exposed by means of a laser sensitometer equipped with a 820 nm diode, and processed (developed) at 115° C. for 25 seconds. The thus obtained images were each evaluated by the measurement with a densitometer. Therein, the values of Dmin and sensitivity (the reciprocal of an exposure amount providing the density higher than Dmin by 3.0) were determined. Additionally, the sensitivities shown in Table 4 are relative values, with the photosensitive material X' being taken as 100. Further, each photosensitive material was examined for gradient $\gamma$, which was defined as the slope of a straight line connecting the points on the characteristic curve corresponding to the densities 0.3 and 3.0, respectively.

TABLE 4

| Sample Name | Sensitivity | Dmin | $\gamma$ | note |
|---|---|---|---|---|
| X' | 100 | 0.19 | 15 | invention |
| Y' | 110 | 0.20 | 12 | invention |
| Z' | 30 | 0.25 | 4 | comparison |

As can be seen from Table 4, high sensitivity, low Dmin and high contrast were attained only within the scope of the present invention.

The photothermographic materials according to the present invention have low fog density, high sensitivity, high contrast and excellent storage characteristics before and after processing operations.

What is claimed is:

1. A photothermographic material having on at least one side of a support, a binder, an organic silver salt, a reducing agent for silver ions and light-sensitive silver halide grains, said photothermographic material containing a dye represented by the following formula (I) or (II):

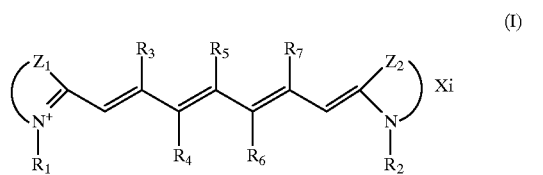

(I)

wherein $R_1$ and $R_2$ each represents a carboxyalkyl group having 2 to 5 carbon atoms including the carbon atom of the carboxy moiety, the carboxy moiety of which has the undissociated form of COOH or the ionic form of COO$^-$; two substituents selected from among $R_3$, $R_4$, $R_5$, $R_6$ and $R_7$ so as to form a couple of $R_3$ and $R_5$, a couple of $R_4$ and $R_6$ or a couple of $R_5$ and $R_7$ represent groups for forming a 6-membered ring by combining with each other, and each of the substituents except those participating in the ring formation represents a hydrogen atom; $Z_1$ and $Z_2$ each represents an atomic group for completing a 5- or 6-membered nitrogen-containing heterocyclic ring; and X represents a counter ion for adjusting the charge balance;

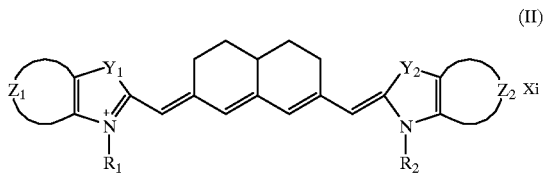
(II)

wherein $Y_1$ represents an oxygen atom, a sulfur atom, a selenium atom, NR or CR'=CR"—, wherein R is a lower alkyl group and R' and R" each represents a hydrogen atom or an alkyl group; $Y_2$ represents an oxygen atom, NR or —CR'=CR"—, wherein R is a lower alkyl group, and R' and R" each represents a hydrogen atom or an alkyl group; $Z_1$ and $Z_2$ each represents a nonmetal atomic group for completing a benzene or naphthalene ring; X represents a counter ion for adjusting the charge balance; i represents 0 or 1; $R_1$ and $R_2$ each represents a carboxyalkyl group, the carboxy moiety of which has the undissociated form of COOH or the ionic form of COO$^-$.

2. The photothermographic material as claimed in claim 1, wherein $R_1$ and $R_2$ in formula (I) each represents a carboxymethyl group, a carboxyethyl group, a carboxypropyl group or a carboxybutyl group.

3. The photothermographic material as claimed in claim 1, wherein the 5- or 6-membered nitrogen-containing heterocyclic ring formed by $Z_1$ or $Z_2$ in formula (I) represents a thiazole nucleus, a benzothiazole nucleus, a naphthothiazole nucleus, a thiazoline nucleus, an oxazole nucleus, a benzoxazole nucleus, a naphthoxazole nucleus, an oxazoline nucleus, a selenazole nucleus, a benzoselenazole nucleus, a naphthoselenazole nucleus, a 3,3-dialkylindolenine nucleus, an imidazole nucleus, a pyridine nucleus, a quinoline nucleus, an imidazo[4,5-b]quinoxaline nucleus, a benzotellurazole nucleus, a naphthotallurazole nucleus, an oxadiazole nucleus, a thiadiazole nucleus, a tetrazole nucleus and a pyrimidine nucleus.

4. The photothermographic material as claimed in claim 1, wherein the 5- or 6-membered nitrogen-containing heterocyclic ring formed by $Z_1$ or $Z_2$ in formula (I) represents a benzothiazole nucleus, a benzoxazole nucleus, a benzoimidazole nucleus, a naphthoxazole nucleus, a naphthothiazole nucleus or a quinoline nucleus.

5. The photothermographic material as claimed in claim 1, wherein $R_1$ and $R_2$ in formula (I) each independently represents a carboxypropyl or carboxybutyl group, $R_3$ and $R_5$ combine with each other to form a 6-membered ring, $R_4$, $R_6$ and $R_7$ each represents a hydrogen atom and $Z_1$ and $Z_2$ each represents a member of a thiazole nucleus.

6. The photothermographic material as claimed in claim 1, wherein R in formula (II) represents a methyl group, an ethyl group, a propyl group, a $C_{1-3}$ alkyl group substituted with at least one fluorine atom, a methoxyethyl group, an ethoxyethyl group, a carboxymethyl group, a carboxyethyl group or a carboxypropyl group.

7. The photothermographic material as claimed in claim 1, wherein R' and R" in formula (II) each represents a hydrogen atom or a straight-chain or branched alkyl group containing 1 to 8 carbon atom.

8. The photothermographic material am claimed in claim 1, wherein R' and R" in formula (II) each represents a hydrogen atom, a methyl group, an ethyl group, a propyl group, a $C_{1-3}$ alkyl group substituted with at least one fluorine atom, a methoxyethyl group, an ethoxyethyl group, a carboxymethyl group, a carboxyethyl group and a carboxypropyl group.

9. The photothermographic material as claimed in claim 1, $R_1$ and $R_2$ in formula (II) each represents a carboxyalkyl group containing 2 to 22 carbon atoms.

10. The photothermographic material as claimed in claim 1, $R_1$ and $R_2$ in formula (II) each represents a carboxyalkyl group containing 2 to 6 carbon atoms.

11. The photothermographic material as claimed in claim 1, wherein, in formula (II), $Y_1$ is a sulfur atom, $Y_2$ is an oxygen atom, and at least one of $Z_1$ and $Z_2$ forms a substituted or unsubstituted naphthalene ring.

12. The photothermographic material as claimed in claim 1, which contains the dye represented by formula (I) or (II) in an amount of from 1 $\mu$mole to 1 mole per mole of silver halide.

13. A photothermographic material having on at least one side of a support, a binder, an organic silver salt, a reducing agent for silver ions and light-sensitive silver halide grains, said photothermographic material containing a dye represented by the following formula (I) or (II):

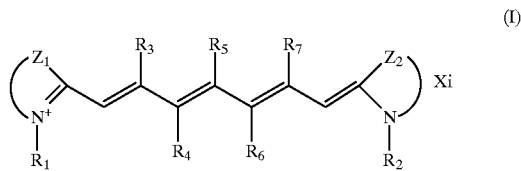
(I)

wherein $R_1$ and $R_2$ each represents a carboxyalkyl group having 2 to 5 carbon atoms including the carbon atom of the carboxy moiety, the carboxy moiety of which has the undissociated form of COOH or the ionic form of COO$^-$; two substituents selected from among $R_3$, $R_4$, $R_5$, $R_6$ and $R_7$ so as to form a couple of $R_3$ and $R_5$, a couple of $R_4$ and $R_6$ or a couple of $R_5$ and $R_7$ represent groups for forming a 6-membered ring by combining with each other, and each of the substituents except those participating in the ring formation represents a hydrogen atom; $Z_1$ and $Z_2$ each represents an atomic group for completing a 5- or 6-membered nitrogen-containing heterocyclic ring; and X represents a counter ion for adjusting the charge balance;

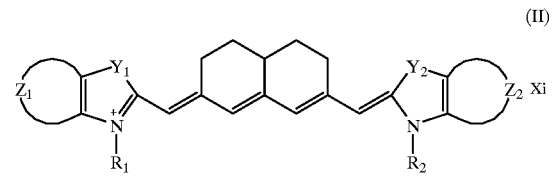
(II)

wherein $Y_1$ represents an oxygen atom, a sulfur atom, a selenium atom, NR or —CR'=CR"—; R represents a lower alkyl group; R' and R" each represents a hydrogen atom or an alkyl group; $Y_2$ represents an oxygen atom, a selenium atom, NR or —CR'=CR"—; $Z_1$ and $Z_2$ each represents a nonmetal atomic group for completing a benzene or naphthalene ring; X represents a counter ion for adjusting the charge balance; i represents 0 or 1; $R_1$ and $R_2$ each represents a carboxyalkyl group, the carboxy moiety of which has the undissociated form of COOH or the ionic form of COO$^-$.

14. A photothermographic material having on at least one side of a support, a binder, an organic silver salt, a reducing agent for silver ions and light-sensitive silver halide grains, said photothermographic material containing a dye represented by the following formula (I):

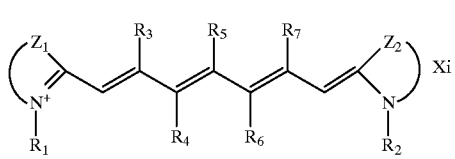

wherein $R_1$ and $R_2$ each represents a carboxyalkyl group having 2 to 5 carbon atoms including the carbon atom of the carboxy moiety, the carboxy moiety of which has the undissociated form of COOH or the ionic form of $COO^-$; only two substituents selected from among $R_3$, $R_4$, $R_5$, $R_6$ and $R_7$ form one couple of $R_3$ and $R_5$, one couple of $R_4$ and $R_6$ or one couple of $R_5$ and $R_7$ and represent groups for forming a 6-membered ring by combining with each other, and each of the substituents except those participating in the single ring formation represents a hydrogen atom; $Z_1$ and $Z_2$ each represents an atomic group for completing a 5- or 6-membered nitrogen-containing heterocyclic ring; and X represents a counter ion for adjusting the charge balance.

15. A photothermographic material having on at least one side of a support, a binder, an organic silver salt, a reducing agent for silver ions and light-sensitive silver halide grains, said photothermographic material containing a dye represented by the following formula (II):

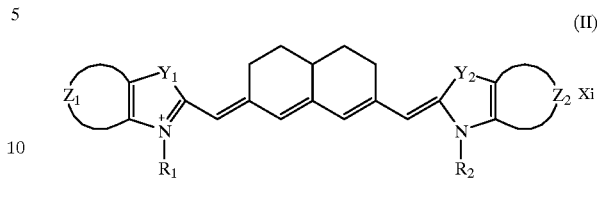

wherein $Y_1$ represents an oxygen atom, a sulfur atom, a selenium atom, NR or $—CR'=CR''—$; R represents a lower alkyl group; R' and R'' each represents a hydrogen atom or an alkyl group; $Y_2$ represents an oxygen atom, a selenium atom, NR or $—CR'=CR''—$; $Z_1$ and $Z_2$ each represents a nonmetal atomic group for completing a benzene or naphthalene ring; X represents a counter ion for adjusting the charge balance; i represents 0 or 1; $R_1$ and $R_2$ each represents a carboxyalkyl group, the carboxy moiety of which has the undissociated form of COOH or the ionic form of $COO^-$.

* * * * *